United States Patent
Lee et al.

(10) Patent No.: US 9,014,130 B2
(45) Date of Patent: Apr. 21, 2015

(54) METHOD AND APPARATUS FOR TRANSMITTING CONTROL INFORMATION THROUGH UPLINK

(71) Applicant: LG Electronics Inc., Seoul (KR)

(72) Inventors: Hyun Woo Lee, Anyang-si (KR); Hyuk Min Son, Anyang-si (KR); Hye Young Choi, Anyang-si (KR); Seung Hee Han, Anyang-si (KR); Jin Min Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/353,742

(22) PCT Filed: Oct. 29, 2012

(86) PCT No.: PCT/KR2012/008957
§ 371 (c)(1),
(2) Date: Apr. 23, 2014

(87) PCT Pub. No.: WO2013/062396
PCT Pub. Date: May 2, 2013

(65) Prior Publication Data
US 2014/0269600 A1  Sep. 18, 2014

Related U.S. Application Data

(60) Provisional application No. 61/551,942, filed on Oct. 27, 2011.

(51) Int. Cl.
*H04W 4/00* (2009.01)
*H04W 52/38* (2009.01)
(Continued)

(52) U.S. Cl.
CPC .............. *H04W 52/38* (2013.01); *H04L 5/0007* (2013.01); *H04L 5/0053* (2013.01); *H04L 1/004* (2013.01); *H04L 1/1607* (2013.01); *H04L 5/0055* (2013.01)

(58) Field of Classification Search
CPC ... H04W 52/38; H04L 5/0007; H04L 5/0053; H04L 5/0055
USPC ......... 370/328–329, 335–336, 342–343, 345, 370/389, 392, 441–442, 474, 476, 479–480
See application file for complete search history.

(56) References Cited

U.S. PATENT DOCUMENTS 8,549,374 B2 * 10/2013 Yin et al. ...................... 714/751
2007/0129096 A1 * 6/2007 Okumura et al. ............. 455/522
(Continued)

FOREIGN PATENT DOCUMENTS

KR   10-2006-0119712 A   11/2006
KR   10-2008-0108887 A   12/2008
(Continued)

*Primary Examiner* — Kevin Mew
(74) *Attorney, Agent, or Firm* — McKenna Long & Aldridge LLP

(57) ABSTRACT

Provided is a method for transmitting control information by a terminal, the terminal generates a first bit stream for first control information and a second bit stream for second control information; determines the transmission power of the first bit stream and the second bit stream on the basis of the weight of the first control information with respect to the second control information; generates a multiplexed bit stream by multiplexing the first bit stream and the second bit stream; and transmits the multiplexed bit stream to a base station on the basis of the transmission power.

13 Claims, 16 Drawing Sheets

(51) Int. Cl.
*H04L 5/00* (2006.01)
*H04L 1/00* (2006.01)
*H04L 1/16* (2006.01)

(56) References Cited

U.S. PATENT DOCUMENTS

| | | | |
|---|---|---|---|
| 2011/0141988 A1* | 6/2011 | Park et al. | 370/329 |
| 2011/0243066 A1* | 10/2011 | Nayeb Nazar et al. | 370/328 |
| 2011/0249578 A1* | 10/2011 | Nayeb Nazar et al. | 370/252 |
| 2011/0269490 A1* | 11/2011 | Earnshaw et al. | 455/509 |
| 2011/0310780 A1* | 12/2011 | Xiao et al. | 370/310 |
| 2011/0317778 A1* | 12/2011 | Hooli et al. | 375/260 |
| 2012/0033587 A1* | 2/2012 | Papasakellariou et al. | 370/277 |
| 2012/0099491 A1* | 4/2012 | Lee et al. | 370/280 |
| 2014/0119336 A1* | 5/2014 | LIU et al. | 370/330 |

FOREIGN PATENT DOCUMENTS

| | | |
|---|---|---|
| KR | 10-2010-0086920 A | 8/2010 |
| KR | 10-2010-0103733 | 9/2010 |
| KR | 10-2011-0088393 A | 8/2011 |
| WO | 2009/010069 A2 | 8/2009 |

* cited by examiner

METHOD AND APPARATUS FOR TRANSMITTING CONTROL INFORMATION THROUGH UPLINK

This application is a 35 USC §371 National Stage entry of International Application No. PCT/KR2012/008957, filed on Oct. 29, 2012, which claims priority to U.S. Provisional Application No. 61/551,942, filed on Oct. 27, 2011, both of which are hereby incorporated by reference in their entirety.

BACKGROUND OF THE INVENTION

1. Field of the Invention

The present invention relates to wireless communication and, more particularly, to a method of transmitting control information through uplink and a wireless device using the same.

2. Background Art Related Art

The next-generation multimedia wireless communication systems now being actively researched are required to process and send various pieces of information, such as video and wireless data out of the early voice-centered service. The $4^{th}$ generation wireless communication systems being developed which are subsequent to the current $3^{rd}$ generation wireless communication systems are aiming at supporting high-speed data service of downlink 1 Gigabit per second (Gbps) and of uplink 500 Megabits per second (Mbps). An object of a wireless communication system is to enable a number of users to perform reliable communication irrespective of their locations and mobility. However, a wireless channel has abnormal characteristics, such as a path loss, noise, a fading phenomenon attributable to multi-path, Inter-Symbol Interference (ISI), and the Doppler effect resulting from the mobility of a terminal. A variety of techniques are being developed in order to overcome the abnormal characteristics of wireless channels and to increase the reliability of wireless communication.

Long Term Evolution (LTE) based on $3^{rd}$ Generation Partnership Project (3GPP) Technical Specification (TS) Release 8 is a leading next-generation mobile communication standard.

As disclosed in 3GPP TS 36.211 V8.7.0 (2009-05) "Evolved Universal Terrestrial Radio Access (E-UTRA); Physical Channels and Modulation (Release 8)", in LTE, physical channels may be divided into a Physical Downlink Shared Channel (PDSCH) and a Physical Downlink Control Channel (PDCCH), that is, downlink channels, and a Physical Uplink Shared Channel (PUSCH) and a Physical Uplink Control Channel (PUSCH), that is, uplink channels.

A PUCCH is an uplink control channel that is used to send uplink control information, such as a Hybrid Automatic Repeat reQuest (HARM) acknowledgement/not-acknowledgement (ACK/NACK) signal, a Channel Quality Indicator (CQI), and a Scheduling Request (SR).

Meanwhile, 3GPP LTE-Advanced (A), that is, the evolution of 3GPP LTE, is in progress. Technology introduced into 3GPP LTE-A includes a Carrier Aggregation (CA) and Multiple Input Multiple Output (MIMO) supporting four or more antenna ports.

A CA uses a plurality of component carriers. A component carrier is defined by the center frequency and the bandwidth. A single downlink component carrier or a pair of an uplink component carrier and a downlink component carrier corresponds to a single cell. It may be said that a terminal supplied with service using a plurality of downlink component carriers is supplied with service from a plurality of serving cells.

Furthermore, research is being carried out on structure/schemes for sending HARQ ACK/NACK, Channel State Information (CSI) and/or sounding, that is, control information in 3GPP LTE-A, the definition of a CA environment, and control technology.

SUMMARY OF THE INVENTION

An object of the present invention is to provide a method of transmitting control information through uplink and a wireless device using the same.

Another object of the present invention is to provide a method of transmitting different pieces of information through a single physical channel structure and a wireless device using the same.

In accordance with an embodiment of the present invention, there is provided a method for transmitting control information through uplink in a wireless communication system. The method includes steps of generating a first bit stream for first control information and a second bit stream for a second control information; determining transmission power of each of the first bit stream and the second bit stream based on the weight of the first control information in relation to the second control information; generating a multiplexed bit stream by multiplexing the first bit stream and the second bit stream; and transmitting the multiplexed bit stream to a base station based on the transmission power.

In accordance with another embodiment of the present invention, there is provided a method for transmitting control information through uplink in a wireless communication system. The method includes steps of generating a first bit stream for first control information and a second bit stream for a second control information; determining effective coding rates of the first bit stream and the second bit stream based on the weight of the first control information in relation to the second control information; performing channel coding on the first bit stream and the second bit stream based on the effective coding rates; generating a multiplexed bit stream by multiplexing the channel-coded first bit stream and the channel-coded second bit stream; and transmitting the multiplexed bit stream to a base station.

In accordance with yet another embodiment of the present invention, there is provided wireless device for transmitting control information through uplink in a wireless communication system. The wireless device includes a radio frequency (RF) unit for transmitting and receiving a radio signal and a processor connected to the RF unit. The processor generates a first bit stream for first control information and a second bit stream for a second control information; determines transmission power of each of the first bit stream and the second bit stream based on a weight of the first control information in relation to the second control information; generates a multiplexed bit stream by multiplexing the first bit stream and the second bit stream; and transmits the multiplexed bit stream to a base station based on the transmission power.

In each of the embodiments, the first information may include HARQ ACK or NACK, and the second information may be Channel State Information (CSI).

Furthermore, in each the embodiments, the first bit stream and the second bit stream may include to be transmitted through a Physical Uplink Control Channel (PUCCH) format 3.

Furthermore, in each of the embodiments, the weight may include to be determined based on the priorities of the first control information and the second control information.

There is proposed a method of applying a different weight to each piece of information based on a separate coding scheme. Different types of information can be efficiently supported for different pieces of information. Furthermore, the dropping of specific information can be prevented.

DESCRIPTION OF EXEMPLARY EMBODIMENTS

The following technology may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for Mobile communications (GSM)/General Packet Radio Service (GPRS)/Enhanced Data Rates for GSM Evolution (EDGE). OFDMA may be implemented using radio technology, such as Institute of Electrical and Electronics Engineers (IEEE) 802.11 (Wi-Fi), IEEE 802.16 (WiMAX), IEEE 802.20, or Evolved-UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). 3$^{rd}$ Generation Partnership Project (3GPP) Long Term Evolution (LTE) is part of an Evolved UMTS (E-UMTS) using Evolved-UMTS Terrestrial Radio Access (E-UTRA), and 3GPP LTE adopts OFDMA in downlink and adopts SC-FDMA in uplink. LTE-Advance (LTE-A) is the evolution of 3GPP LTE.

In order to clarify a description, LTE-A is chiefly described, but the technical spirit of the present invention is not limited thereto.

Figure 1:
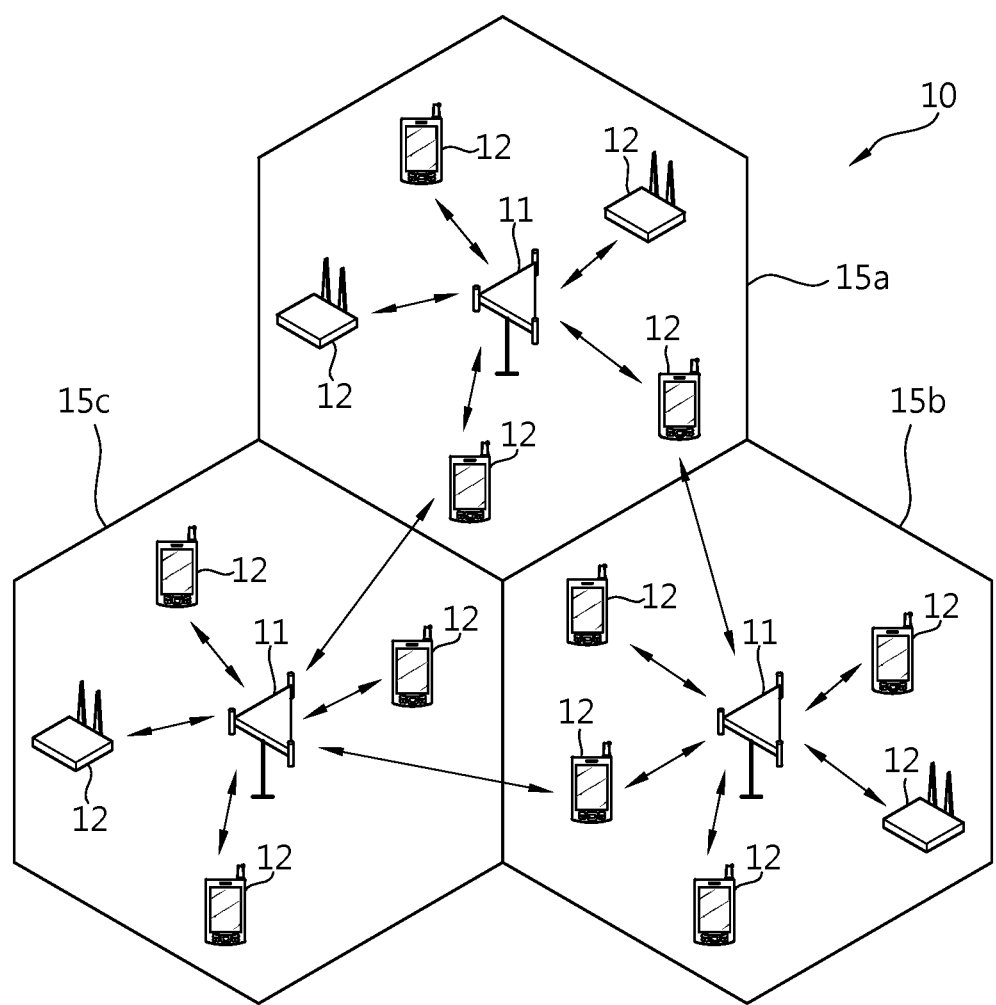
FIG. 1 is a wireless communication system.

FIG. 1 is a wireless communication system.

The wireless communication system 10 includes one or more Base Stations (BSs) 11. The BSs 11 provide communication service to respective geographical areas (commonly called cells) 15a, 15b, and 15c. The cell may be divided into a plurality of regions (called sectors). User Equipment (UE) 12 may be fixed or mobile and also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device. The BS 11 commonly refers to a fixed station that communicates with the MSs 12, and the BS may also be called another terminology, such as an evolved NodeB (eNB), a Base Transceiver System (BTS), or an access point.

In general, UE belongs to a single cell, and a cell to which UE belongs is called a serving cell. A BS that provides a serving cell with communication service is called a serving BS. Since a wireless communication system is a cellular system, another cell neighboring a serving cell is present. Another cell neighboring a serving cell is called a neighbor cell. A BS that provides a neighbor cell with communication service is called a neighbor BS. A serving cell and a neighbor cell are relatively determined on the basis of UE.

In general, downlink refers to communication from the BS 11 to the UE 12, and uplink refers to communication from the UE 12 to the BS 11. In downlink, a transmitter may be part of the BS 11, and a receiver may be part of the UE 12. In uplink, a transmitter may be part of the UE 12, and a receiver may be part of the BS 11.

The wireless communication system may be any one of a Multiple-Input Multiple-Output (MIMO) system, a Multiple-Input Single-Output (MISO) system, a Single-Input Single-Output (SISO) system, and a Single-Input Multiple-Output (SIMO) system. An MIMO system uses a plurality of transmit antennas and a plurality of receive antennas. An MISO system uses a plurality of transmit antennas and one receive antenna. An SISO system uses one transmit antenna and one receive antenna. An SIMO system uses one transmit antenna and a plurality of receive antennas. Hereinafter, a transmit antenna means a physical or logical antenna used to send one signal or stream, and a receive antenna means a physical or logical antenna used to receive one signal or stream.

Figure 2:
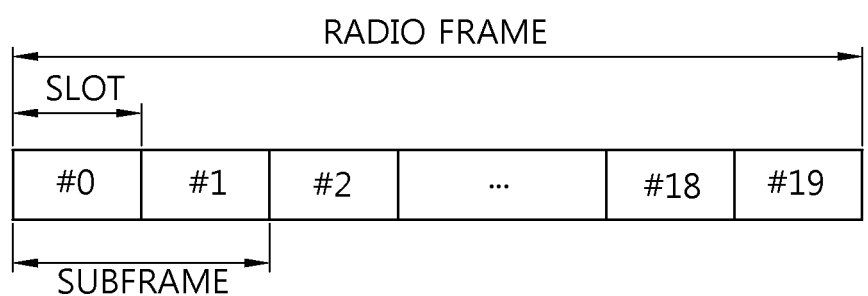
FIG. 2 shows the structure of a radio frame in 3GPP LTE.

FIG. 2 shows the structure of a radio frame in 3GPP LTE.

For the structure of the radio frame, reference may be made to Paragraph 5 of a 3rd Generation Partnership Project (3GPP) TS 36.211 V10.3.0 (2011-09) "Technical Specification Group Radio Access Network; Evolved Universal Terrestrial Radio Access (E-UTRA); Physical channels and modulation (Release 10)". Referring to FIG. 2, the radio frame includes 10 subframes, and one subframe includes two slots. The slots within the radio frame are assigned slot numbers from #0 to #19. The time taken for one subframe to be transmitted is called a Transmission Time Interval (TTI). The TTI may be a scheduling unit for data transmission. For example, the length of one radio frame may be 10 ms, the length of one subframe may be 1 ms, and the length of one slot may be 0.5 ms.

A single slot includes a plurality of Orthogonal Frequency Division Multiplexing (OFDM) symbols in a time domain and includes a plurality of subcarriers in a frequency domain. The OFDM symbol is for representing a single symbol period because 3GPP LTE uses OFDMA in downlink and may be called another terminology depending on a multi-access method. For example, if SC-FDMA is used as an uplink multi-access method, the OFDM symbol may be called an SC-FDMA symbol. A Resource Block (RB) is a resource allocation unit, and it includes a plurality of continuous subcarriers in a single slot. The structure of the radio frame is only an example. Accordingly, the number of subframes included in the radio frame, the number of slots included in a subframe, or the number of OFDM symbols included in a slot may be changed in various ways.

In 3GPP LTE, a single slot is defined to include 7 OFDM symbols in a normal Cyclic Prefix (CP), and a single slot is defined to include 6 OFDM symbols in an extended CP.

A wireless communication system may be basically divided into a Frequency Division Duplex (TDD) method and a Time Division Duplex (TDD) method. In accordance with the FDD method, uplink transmission and downlink transmission are performed while occupying different frequency bands. In accordance with the TDD method, uplink transmission and downlink transmission are performed at different points of time while occupying the same frequency band. A channel response in the TDD method is substantially reciprocal. This means that in a given frequency domain, a downlink channel response and an uplink channel response are almost the same. Accordingly, in a wireless communication system based on TDD, there is an advantage in that a downlink channel response may be obtained from an uplink channel response. In the TDD method, downlink transmission by a BS and uplink transmission by UE may not be performed at the same time because the uplink transmission and the downlink transmission are time-divided in the entire frequency band. In a TDD system in which uplink transmission and downlink transmission are divided in a subframe unit, the uplink transmission and the downlink transmission are performed in different subframes.

Figure 3:
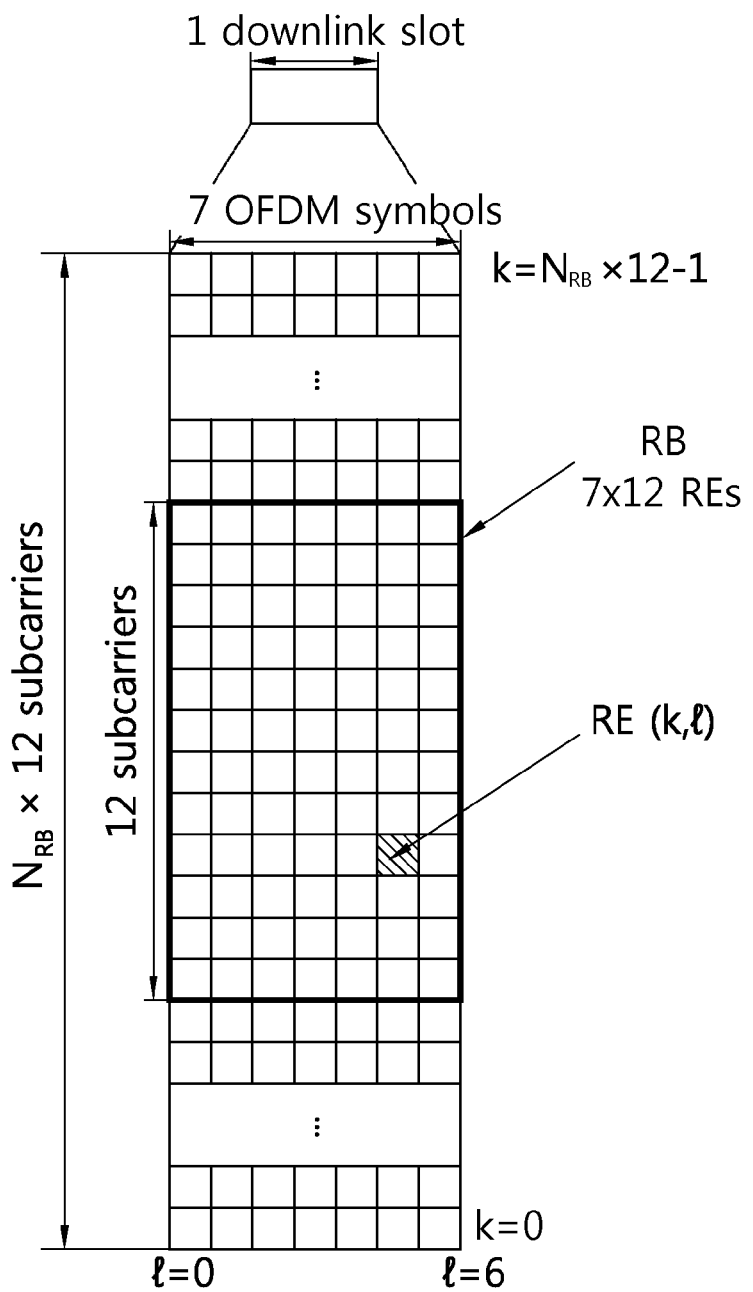
FIG. 3 shows an example of the resource grid of a single downlink slot.

FIG. 3 shows an example of the resource grid of a single downlink slot.

The downlink slot includes a plurality of OFDM symbols in the time domain and includes an $N_{RB}$ number of Resource Blocks (RBs) in the frequency domain. The number of resource blocks $N_{RB}$ included in a downlink slot depends on a downlink transmission bandwidth configured in a cell. For example, in an LTE system, the number of resource blocks $N_{RB}$ may be any one of 60 to 110. A single resource block includes a plurality of subcarriers in the frequency domain. The structure of an uplink slot may be the same as that of the downlink slot.

Each of elements on a resource grid is referred to as a Resource Element (RE). The resource element on the resource grid may be identified by an index pair (k,l) within a slot. In such a case, k (k=0, $N_{RB} \times 12-1$) is a subcarrier index in the frequency domain, and l (l=0, . . . , 6) is an OFDM symbol index in the time domain.

In this case, a single resource block is illustrated as including 7×12 resource elements, including 7 OFDM symbols in the time domain and 12 subcarriers in the frequency domain, but the number of OFDM symbols and the number of subcarriers within the resource block are not limited thereto. The number of OFDM symbols and the number of subcarriers may be changed in various manners depending on the length of a CP, frequency spacing, etc. For example, in the case of a normal CP, the number of OFDM symbols is 7, and in the case of an extended CP, the number of OFDM symbols is 6. In a single OFDM symbol, a single of 128, 256, 512, 1024, 1536, and 2048 may be selected and used as the number of subcarriers.

Figure 4:
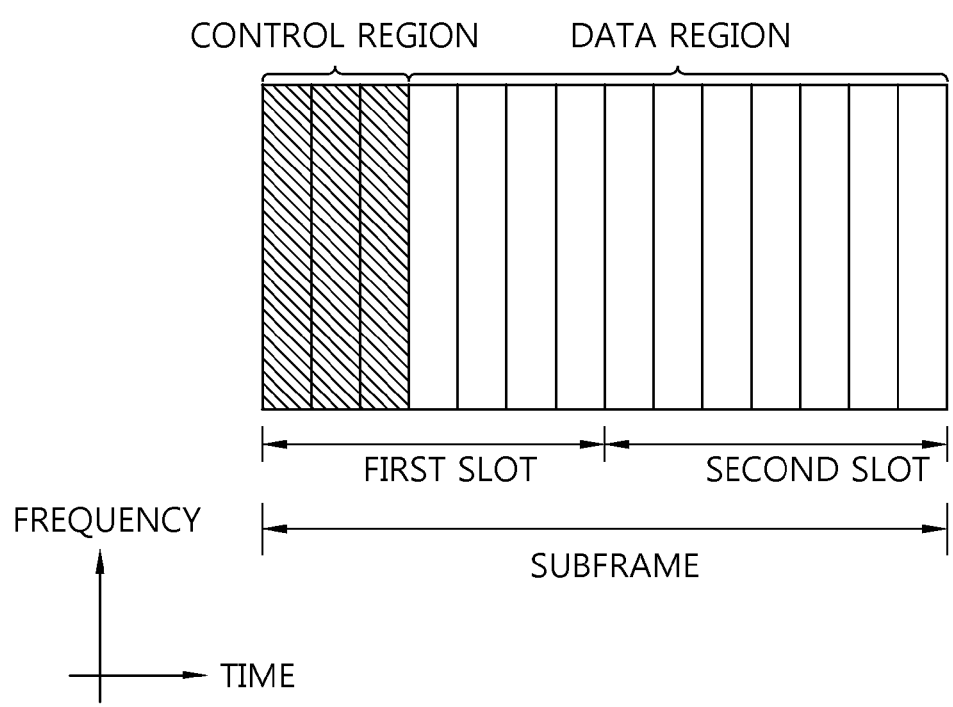
FIG. 4 shows the structure of a downlink subframe.

FIG. 4 shows the structure of a downlink subframe.

A maximum of the former 3 OFDM symbols (a maximum of 4 OFDM symbols for a 1.4 MHz bandwidth) in the first slot within a subframe are a control region to which control channels are allocated, and the remaining OFDM symbols are a data region to which Physical Downlink Shared Channel (PDSCH) are allocated.

A PDCCH can carry information about the allocation of resources and about the transport format of a Downlink-Shared Channel (DL-SCH), information about the allocation of resources on an Uplink Shared Channel (UL-SCH), paging information on a PCH, system information on a DL-SCH, the resource allocation of a higher layer control message, such as a random access response transmitted on a PDSCH, a set of transmission power control commands for individual UE within a specific MS group, and the activation of a Voice over Internet Protocol (VoIP). A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to 9 Resource Element Groups (REGs) each including 4 resource elements. 4 Quadrature Phase Shift Keying (QPSK) symbols are mapped to each REG. A resource element occupied by a Reference Signal (RS) is not included in an REG, and a total number of REGs within a given OFDM symbol may be determined depending on whether or not a Cell-Specific RS (CSR) is present. The format of a PDCCH and the possible number of bits of a PDCCH are determined by a relationship between the number of CCEs and a coding rate provided by the CCEs. The number of CCEs used to send a specific PDCCH may be determined by a BS according to channel conditions. For example, a PDCCH for UE having an excellent channel state may use only a single CCE. However, a PDCCH for UE having a poor channel state may require 8 CCEs in order to obtain sufficient robustness. Furthermore, the transmission power of a PDCCH may be controlled according to channel conditions.

A BS determines a PDCCH format based on a DCI to be transmitted to UE and attaches Cyclic Redundancy Check (CRS) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for a System Information Block (SIB), a system information identifier, for example, a System Information-RNTI (SI-RNTI) may be masked to the CRC. A Random Access-RNTI (RA-RNTI) may be masked to the CRC in order to indicate a random access response, that is, a response to the transmission of a random access preamble by UE.

The limited aggregation of CCE locations at which a PDCCH may be placed in relation to each MS may be defined. An aggregation of CCE locations at which each US may find its own PDCCH is called a search region. The size of a search region is different depending on the format of a PDCCH. The search region may be divided into a Common Search Space (CSS) and a UE-specific Search Space (USS). The CSS is a region in which a PDCCH that carries public control information is searched for and is a search region configured to all MSs in common. The CSS includes 16 CCEs having CCE indices of 0~15 and may support a PDCCH having aggregation levels 4 and 8. However, DCI formats 0/1A that carry UE-specific control information may be transmitted through the CSS. The USS is a search region that is dedicated to a specific MS. The USS may support a PDCCH having aggregation levels 1, 2, 4, and 8. In relation to a single MS, the CSS and the USS may be overlapped with each other. Table 1 shows aggregation levels defined in a search region.

TABLE 1

| | Search Region $S_k^{(L)}$ | | |
|---|---|---|---|
| Type | Aggregation level | Size (in CCEs) | Number of PDCCH candidates $M^{(L)}$ |
| USS | 1 | 6 | 6 |
| | 2 | 12 | 6 |
| | 4 | 8 | 2 |
| | 8 | 16 | 2 |
| CSS | 4 | 16 | 4 |
| | 8 | 16 | 2 |

UE performs blind decoding on a DCI format that is transmitted by a BS through a PDCCH. Blind decoding is a method of demasking an identifier to the CRS of a received PDCCH and checking whether or not be corresponding PDCCH is its own control channel by checking a CRC error. The UE is unaware that its own PDCCH is transmitted using what CCE aggregation level or what DCI format at which place within a control region. In order to reduce the computational load of blind decoding by the UE, the UE does not need to search for all defined DCI format at the same time. In general, the UE may always search for the DCI formats 0/1A in the USS. The DCI format 0 is used for the scheduling of a Physical Uplink Shared Channel (PUSCH). The DCI format 1A is used for the scheduling of a PDSCH and for a random access process reset by a PDCCH order. The DCI formats 0/1A have the same size and may be classified based on a flag within the DCI format. Furthermore, the UE may be further requested to receive DCI formats 1/1B/2 depending on PDSCH transmission mode that is configured by a BS in the USS. The UE may search for DCI formats 1A/1C in the CSS. Furthermore, the UE may be configured to search for DCI formats 3/3A in the CSS. The DCI formats 3/3A may have the same size as the DCI formats 0/1A and may be distinguished from the DCI formats 0/1A by scrambled CRC based on different identities. The UE may perform a maximum of 44 times of blind decoding within a subframe depending on transmission mode and a DCI format.

The control region of each serving cell includes an aggregation of CCEs having indices of 0 to $N_{CCE,k}-1$, wherein $N_{CCE,k}$ is a total number of CCEs within the control region of a subframe k. UE may monitor a PDCCH candidate aggregation as configured in an upper layer on one or more activated serving cells. In this case, monitoring refers to an attempt to decode each PDCCH within the PDCCH candidate aggregation depending on all monitored DCI formats. A search region $S_k^{(L)}$ in an aggregation level 1, 2, 4, or 8 may be defined by the PDCCH candidate aggregation. In each serving cell in which a PDCCH is monitored, a CCE corresponding to the PDCCH candidate m of the search region $S_k^{(L)}$ may be defined by Equation 1.

$$L\{(Y_k+m') \bmod \lfloor N_{CCE,k}/L \rfloor\}+i \quad \text{Equation 1}$$

i=0, 1, ..., L−1, m=0, ..., $M^{(L)}$−1. $M^{(L)}$ is the number of PDCCH candidate that are monitored in a given search region. If a Carrier Indicator Field (CIF) is configured for UE in the USS, m'=m+$M^{(L)}$$n_{CI}$. $n_{CI}$ is a value of the CIF. If the CIF is not configured to UE, m'=m. If an aggregation level is 4 or 8 in the CSS, $Y_k$ is set to 0. If an aggregation level is L in USS $S_k^{(L)}$, $Y_k$ is determined by Equation 2.

$$Y_k=(A \cdot Y_{k-1}) \bmod D \quad \text{Equation 2}$$

In this case, $Y_{k-1}=n_{RNTI} \neq 0$, A=39827, D=65537, k=floor $(n_s/2)$, and $n_s$ is a slot number within a radio frame.

Figure 5:
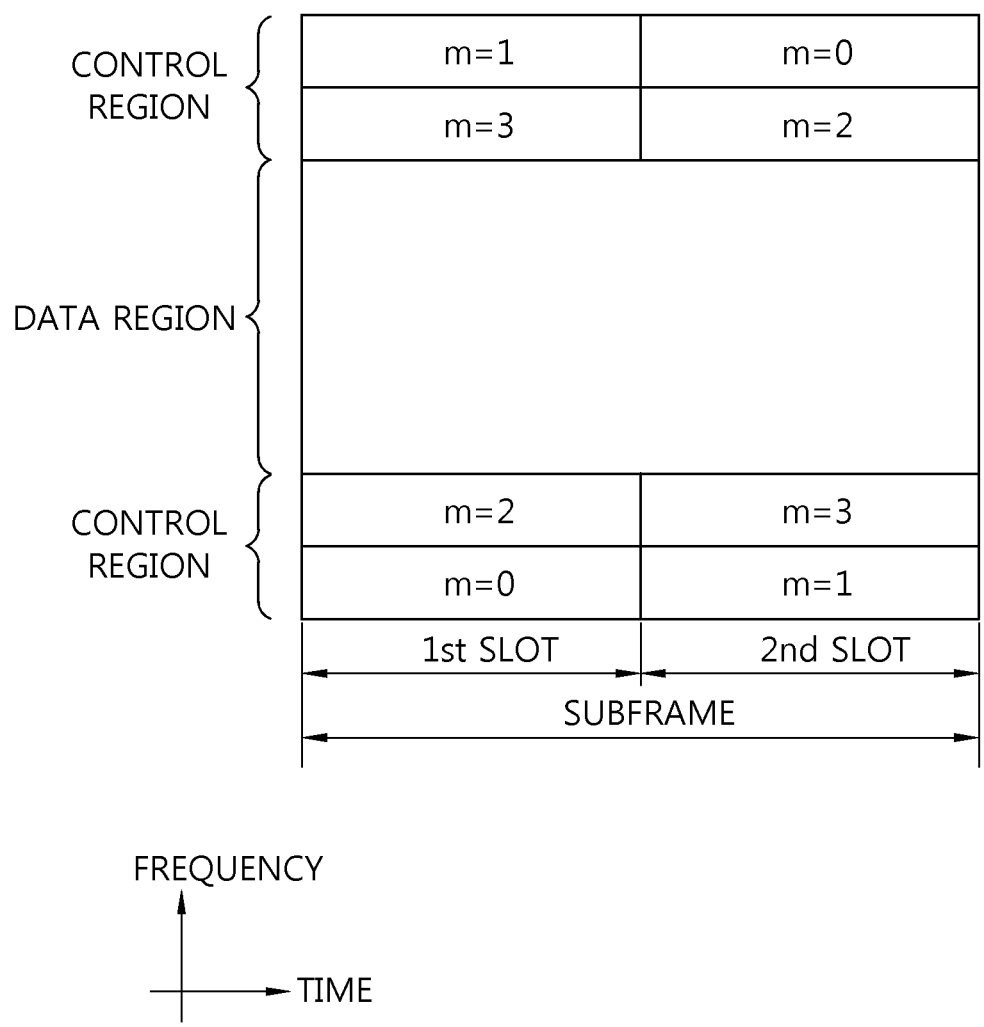
FIG. 5 shows the structure of an uplink subframe.

FIG. 5 shows the structure of an uplink subframe.

The uplink subframe may be divided into a control region and a data region in a frequency domain. A Physical Uplink Control Channel (PUCCH) on which uplink control information is transmitted is allocated to the control region. A Physical Uplink Shared Channel (PUSCH) on which data is transmitted is allocated to the data region. If indication is made by an upper layer, UE may support the simultaneous transmission of a PUSCH and a PUCCH.

A PUCCH for a single MS is assigned as a Resource Block (RB) pair in a subframe. Resource blocks belonging to the RB pair occupy different subcarriers in a first slot and a second slot. A frequency occupied by a resource block that belongs to the RB pair assigned to the PUCCH is changed based on a slot boundary. This is said that the RB pair assigned to the PUCCH has been subject to frequency-hopping at the slot boundary. The MS may obtain a frequency diversity gain by sending uplink control information through different subcarriers over time. m is a location index indicative of the location of a logical frequency domain of the RB pair assigned to the PUCCH in the subframe.

The uplink control information transmitted on the PUCCH includes Hybrid Automatic Repeat Request (HARQ) acknowledgement (ACK), a Channel Quality Indicator (CQI) indicative of a downlink channel state, and a Scheduling Request (SR) that is an uplink radio resource allocation request. Table 2 shows supported PUCCH formats.

TABLE 2

| PDCCH Format | Modulation Method | Number of bits per subframe ($M_{bit}$) |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

The PUCCH format 1 carries a positive SR. The PUCCH format 1a carries HARQ-ACK and a positive SR of 1 bit, and the PUCH format 1b carries HARQ-ACK and a positive SR of 2 bits. The PUCCH format 2 carries CSI not multiplexed with HARQ-ACK or CSI multiplexed with HARQ-ACK in an extended CP. The PUCCH format 2a carries CSI multiplexed with HARQ-ACK of 1 bit in a normal CP. The PUCCH format 2b carries CSI multiplexed with HARQ-ACK of 2 bits in a normal CP. The PUCCH format 3 carries HARQ-ACK up to 10 bits in FDD and carries HARQ-ACK up to 20 bits in TDD. Alternatively, the PUCCH format 3 carries HARQ-ACK up to 10 bits and a positive/negative SR of 1 bit in FDD and HARQ-ACK up to 20 bits and a positive/negative SR of 1 bit in TDD.

A PUSCH is mapped to an UL-SCH that is a transport channel. Uplink data transmitted on the PUSCH may be a transport block, that is, a data block for the UL-SCH transmitted during a TTI. The transport block may be user information, or the uplink data may be multiplexed data. The multiplexed data may be obtained by multiplexing the transport block for the UL-SCH and control information. For example, control information multiplexed with data may include a CQI, a Precoding Matrix Indicator (PMI), HARQ, and a Rank Indicator (RI). Alternatively, the uplink data may include only the control information.

PUCCH resources may be assigned through an implicit mapping method (or a dynamic mapping method) or an explicit mapping method (or a static mapping method). The implicit mapping method is a method of selecting, by UE, a PUCCH resource index based on the smallest CCE index of a PDCCH corresponding to DL transmission, and this method does not require separate signaling for indicating the PUCCH resource index. That is, the PUCCH resource index on which an ACK/NACK signal for a specific PDSCH is transmitted may be determined by a predetermined rule based on the smallest CCE index $n_{CCE}$ of a PDCCH on which the PDSCH is scheduled. For example, in an FDD system, the PUCCH resource index may be determined to be $n_{PUCCH}^{(1,p)} = n_{CCE} + N_{PUCCH}^{(1)}$. In this case, $N_{PUCCH}^{(1)}$ is a value configured by an upper layer.

The explicit mapping method is a method in which a BS directly informs UE of parameters related to PUCCH resource indices or PUCCH resources through a specific field within a DCI format. For example, the BS may inform the UE of four candidate PUCCH resource indices on which an ACK/NACK signal for an SPS PDSCH may be transmitted through an upper layer. Thereafter, the BS may directly inform the UE whether or not to send the ACK/NACK signal for the SPS PDSCH through which one of the four PUCCH resource indices, each including 2 bits, in a Transmit Power Control (TPC) field within the DCI format indicative of SPS activation.

Figure 6:
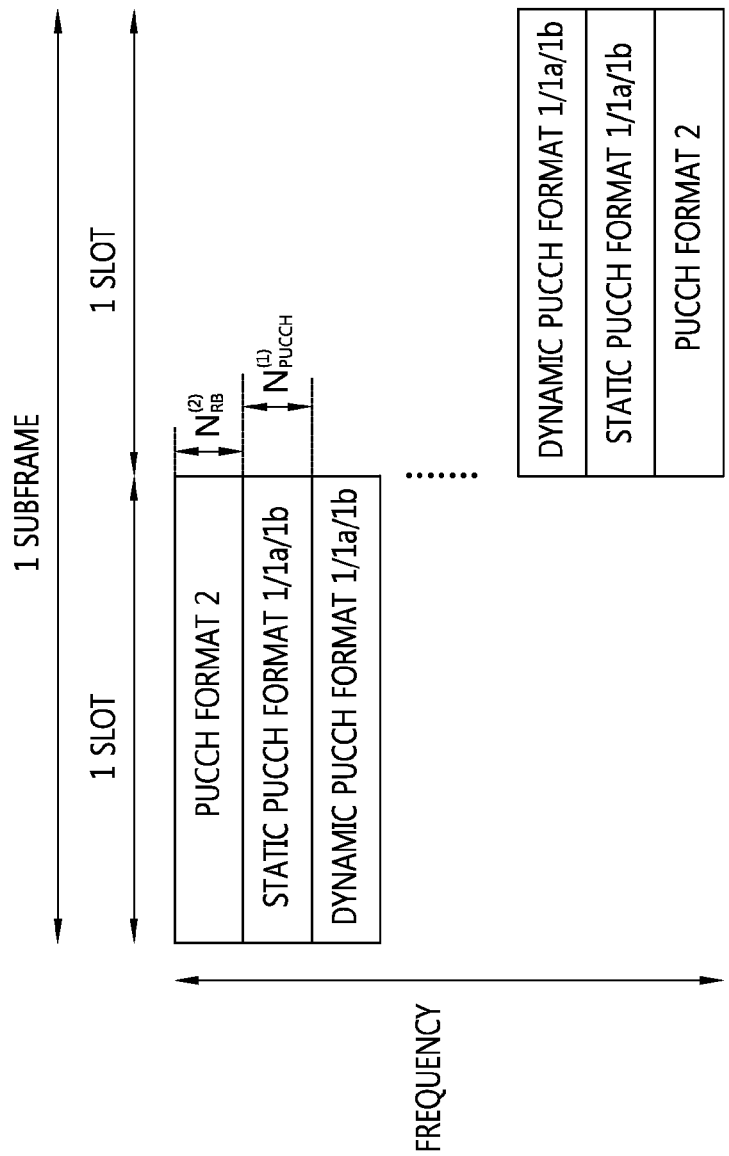
FIG. 6 shows an example of the allocation of PUCCH resources.

FIG. 6 shows an example of the allocation of PUCCH resources.

Referring to FIG. 6, in the PUCCH format 2, resources corresponding to the foremost $N_{RB}^{(2)}$ in the frequency domain of a first slot may be assigned to. Next, in the static PUCCH formats 1/1a/1b, resources corresponding to $N_{PUCCH}^{(1)}$ may be assigned. Next, the dynamic PUCCH formats 1/1a/1b may be mapped by implicit mapping. The resource index of the PUCCH formats 1/1a/1b may be determined to be $n_{PUCCH} = n_{CCE} + N_{PUCCH}^{(1)}$, and $n_{CCE}$ is the smallest CCE index on which a PDCCH requiring the transmission of an ACK/NACK signal or a PDCCH corresponding to a PDSCH requiring the transmission of an ACK/NACK signal has been detected. Accordingly, a dynamic PUCCH region is not overlapped with a static PUCCH region, and a static PUCCH region may be disposed anterior to a dynamic PUCCH region. $N_{RB}^{(2)}$ and $N_{PUCCH}^{(1)}$ may be given by an upper layer. The end of a region to which the dynamic PUCCH format 1/1a/1b is assigned has not been determined, and the region may be used by a BS without limitation.

There is a growing need for a high data transfer rate, and thus in 3GPP LTE-A, a Carrier Aggregation (CA) supporting a plurality of cells may be used. A CA may be called another term, such as a bandwidth aggregation. A CA means that a wireless communication system constructs a wide band by collecting one or more carriers each having a smaller bandwidth than the wide band when attempting to support the wide band. Carriers to be collected when collecting one or more carriers may have bandwidths used in an existing system for the purpose of backward compatibility with the existing system. For example, in 3GPP LTE, bandwidths of 1.4 MHz, 3 MHz, 5 MHz, 10 MHz, 15 MHz, and 20 MHz are supported. In 3GPP LTE-A, a wide band of 20 MHz or more may be configured using only the bandwidths of a 3GPP LTE system. Alternatively, a wide band may be configured by defining a new bandwidth without using the bandwidths of an existing system.

A plurality of BSs and MSs may communicate with each other through a maximum of 5 cells. The 5 cells may correspond to a maximum of 100 MHz bandwidth. That is, a CA environment shows the case where a specific MS has two or more configured serving cells (hereinafter called cells) having different carrier frequencies. The carrier frequency indicates the center frequency of a cell.

A cell indicates a combination of DL resources and UL resources optionally. That is, the cell necessarily includes the DL resources and may optionally include the UL resources combined with the DL resources. The DL resources may be a DL Component Carrier (DL CC). The UL resources may be an UL CC. If a specific MS has a single configured serving cell, the MS may have a single DL CC and a single UL CC. If a specific MS has two or more cells, the MS may have DL CCs equal to the number of cells and UL CCs smaller than or equal to the number of cells. That is, in current 3GPP LTE-A, if a CA is supported, the number of DL CCs may be always greater than or equal to the number of UL CCs. In releases after 3GPP LTE-A, however, a CA in which the number of DL CCs is smaller than the number of UL CCs may be supported.

Linkage between the carrier frequency of a DL CC and the carrier frequency of an UL CC may be indicated by system information transmitted on the DL CC. The system information may be System Information Block type2 (SIB2).

Figure 7:
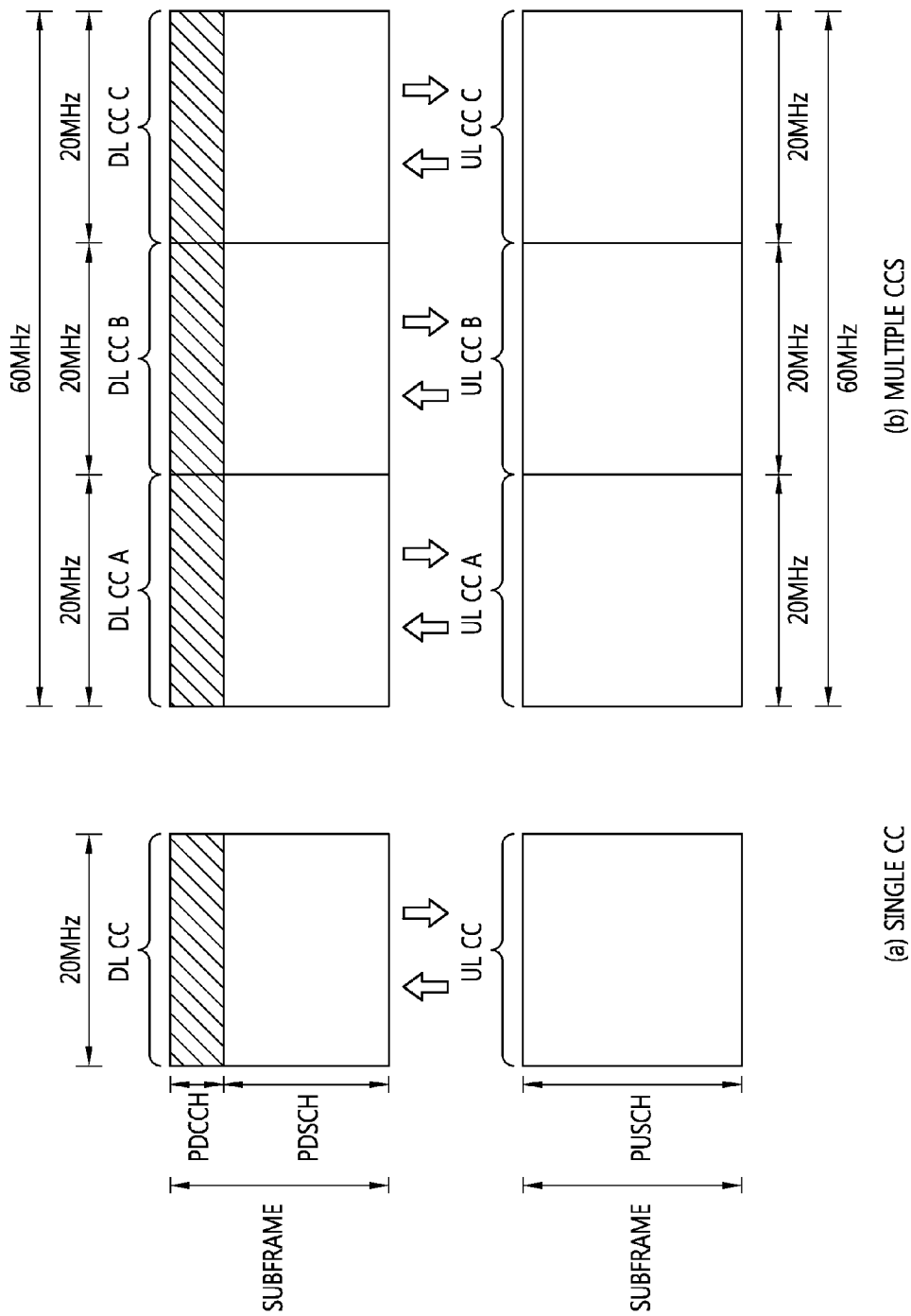
FIG. 7 shows an example of the subframe structures of a single carrier system and a carrier aggregation system.

FIG. 7 shows an example of the subframe structures of a single carrier system and a carrier aggregation system.

FIG. 7-(a) shows a single carrier system. A system bandwidth of FIG. 7-(a) is assumed to be 20 MHz. Since the number of carriers is 1, each of the bandwidth of a DL CC transmitted by a BS and the bandwidth of an UL CC transmitted by UE is 20 MHz. The BS performs DL transmission through the DL CC, and the UE performs UL transmission through the UL CC.

FIG. 7-(b) shows a carrier aggregation system. A system bandwidth of FIG. 7-(b) is assumed to be 60 MHz. A downlink bandwidth includes a DL CC A, a DL CC B, and a DL CC C each having a bandwidth of 20 MHz. An uplink bandwidth includes an UL CC A, an UL CC B, and an UL CC C each having a bandwidth of 20 MHz. A BS performs DL transmission through the DL CC A, the DL CC B, and the DL CC C, and UE performs UL transmission through the UL CC A, the UL CC B, and the UL CC C. The DL CC A and the UL CC A, the DL CC B and the UL CC B, and the DL CC C and the UL CC C may correspond to each other.

UE may monitor and/or receive a DL signal and/or data, transmitted through a plurality of DL CCs, at the same time. Although a cell manages N DL CCs, a BS may configure M DL CCs in cell-specific or UE-specific way so that UE monitors only a DL signal and/or data transmitted through the M DL CCs less than the N DL CCs. Furthermore, a BS may configure L DL CCs in a cell-specific way or UE-specific way so that UE monitors a DL signal and/or data, transmitted through the L DL CCs of M DL CCs, with priority.

UE supports a CA may use a primary cell (PCell) and one or more secondary cells (SCell) for an increased bandwidth. That is, if two or more cells are present, a single cell becomes a PCell, and the remaining cells become Scells. Both the PCell and the SCell may become serving cells. UE of an RRC_CONNECTED state which does not support or cannot support a CA may have only a single serving cell including a PCell. UE of an RRC_CONNECTED state which supports a CA may have one or more serving cells including a PCell and all Scells. Meanwhile, in a TDD system, the UL-DL configuration of all cells may be the same.

A PCell may be a cell that operates in a primary frequency. A PCell may be a cell on which UE performs Radio Resource Control (RRC) connection with a network. A PCell may be a cell having the smallest cell index. A PCell may be a cell on which UE first attempts random access through a Physical Random Access Channel (PRACH), of a plurality of cells. A PCell may be a cell on which UE performs an initial connection establishment process or a connection re-establishment process in a CA environment. Alternatively, a PCell may be a cell indicated in a handover process. UE may obtain Non-Access Stratum (NAS) mobility information (e.g., a Tracking Area Indicator (TAI)) when performing RRC connection/reconfiguration/handover through a PCell. Furthermore, UE may obtain security input when performing RRC reconfiguration/handover through a PCell. UE may receive and send a PUCCH assigned thereto only in a PCell. Furthermore, UE may apply system information acquisition and system information change monitoring to only a PCell. A network may change the PCell of UE which supports a CA in a handover process using an RRCConnectionReconfiguration message including MobilityControlInfo.

An SCell may be a cell that operates in a secondary frequency. An SCell is used to provide additional radio resources. A PUCCH is not assigned to an SCell. A network provides UE in an RRC_CONNECTED state with all pieces of system information related to the operation of a cell through dedicated signaling when adding an SCell. In relation to an SCell, the change of system information may be performed by the release and addition of a related cell, and a network may add, remove, or modify an SCell independently through an RRC connection re-establishment process using an RRCConnectionReconfiguration message.

LTE-A UE supporting a CA may send or receive one CC or a plurality of CCs at the same time depending on its capacity. LTE rel-8 UE may send or receive only a single CC when each of CCs forming a CA is compatible with an LTE rel-8 system. Accordingly, if the number of CCs used in uplink is at least the same as the number of CCs used in downlink, all the CCs need to be configured to be compatible with LTE rel-8. Furthermore, in order to efficiently use a plurality of CCs, the plurality of CCs may be managed in Media Access Control (MAC). If a CA is configured in DL, a receiver within UE needs to be able to receive a plurality of DL CCs. If a CA is configured in UL, a transmitter within UE needs to be able to send a plurality of UL CCs.

As a CA environment is introduced, cross-carrier scheduling may be applied. A PDCCH on a specific DL CC may schedule a PDSCH on any one of a plurality of DL CCs or schedule a PUSCH on any one of a plurality of UL CCs through cross-carrier scheduling. For cross-carrier scheduling, a Carrier Indicator Field (CIF) may be defined. A CIF may be included in a DCI format transmitted on a PDCCH. Whether or not the CIF is present in the DCI format may be indicated by an upper layer semi-statically or in a UE-specific way. When cross-carrier scheduling is performed, a CIF may indicate a DL CC on which a PDSCH is scheduled or an UL CC on which a PUSCH is scheduled. The CIF may have fixed 3 bits and may be present at a fixed location irrespective of the size of a DCI format. If a CIF is not present in a DCI format, a PDCCH on a specific DL CC may schedule PDSCHs on the same DL CC or schedule a PUSCH on an UL CC connected to the specific DL CC through SIB2.

If cross-carrier scheduling is performed using a CIF, a BS may assign a PDCCH monitoring DL CC aggregation in order to reduce the complexity of blind decoding by UE. The PDCCH monitoring DL CC aggregation is some of all DL CCs, and UE performs blind decoding on only PDCCHs within the PDCCH monitoring DL CC aggregation. That is, in order to schedule a PDSCH and/or a PUSCH in relation to the UE, a BS may send a PDCCH through only a DL CC within the PDCCH monitoring DL CC aggregation. The PDCCH monitoring DL CC aggregation may be configured in a UE-specific way, a UE group-specific way, or a cell-specific way.

Figure 8:
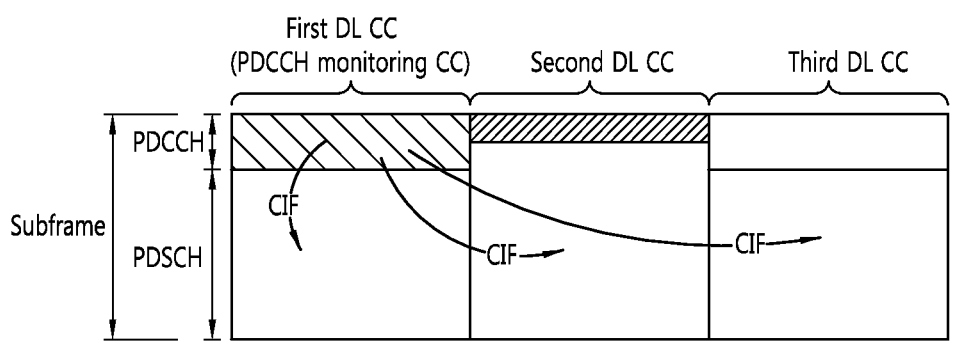
FIG. 8 shows an example of the subframe structure of a 3GPP LTE-A system that is subject to cross-carrier scheduling through a CIF.

FIG. 8 shows an example of the subframe structure of a 3GPP LTE-A system that is subject to cross-carrier scheduling through a CIF.

Referring to FIG. 8, the first DL CC of 3 DL CCs is configured as a PDCCH monitoring DL CC. If cross-carrier scheduling is not performed, each of the DL CCs schedules a PDSCH in order to send each PDCCH. If cross-carrier scheduling is performed, only the first DL CC configured as the PDCCH monitoring DL CC sends the PDCCH. The PDCCH transmitted on the first DL CC schedules the PDSCHs of a second DL CC and a third DL CC using a CIF in addition to the PDSCH of the first DL CC. The second DL CC and the third DL CC not configured as the PDCCH monitoring DL CC do not send a PDCCH.

Meanwhile, cross-carrier scheduling is not supported for a PCell. That is, a PCell is always scheduled by its own PDCCH. The UL grant and DL assignment of a cell are always scheduled by the same cell. That is, if DL is scheduled on a second carrier in a cell, UL is also scheduled on a second carrier. A PDCCH order may be transmitted on only a PCell. Furthermore, in an aggregated cell, frame timing, Super Frame Number (SFN) timing, etc. may be aligned.

If an aggregation level on a PCell is 4 or 8, UE may monitor a single CSS. UE for which a CIF has not been set monitors a single USS if an aggregation level on an activated serving cell is any one of 1, 2, 4, and 8. UE for which a CIF has been set monitors one or more USSs if an aggregation level on one or more activated serving cells is any one of 1, 2, 4, and 8 as configured by an upper layer. The CSS and the USS may overlap with each other on the PCell.

UE for which a CIF associated with a PDCCH monitored in a serving cell has been set monitors a PDCCH which consists of a CIF in the USS of the serving cell and includes CRS scrambled by a C-RNTI. UE for which a CIF associated with a PDCCH monitored in a PCell has been set monitors a PDCCH which consists of a CIF in the USS of the PCell and includes CRC scrambled by an SPS C-RNTI. Furthermore, the UE may monitor the PDCCH by searching a CSS without a CIF. In relation to a serving cell in which a PDCCH is monitored, UE for which a CIF has not been set monitors a USS without a CIF for the PDCCH. UE for which a CIF has been set monitors a USS through a CIF for a PDCCH. If UE is configured to monitor a PDCCH in an SCell through a CIF in another serving cell, the UE may not monitor the PDCCH of the SCell.

Furthermore, UE may send uplink control information, such as Channel State Information (CSI) or an ACK/NACK signal received, detected, or measured from one or more DL CCs, to a BS through a predetermined single UL CC. The CSI may include a CQI, a PMI, an RI, etc. For example, if UE needs to send an ACK/NACK signal for data received from the DL CCs of a PCell and the DL CCs of an SCell, the UE may multiplex or bundle a plurality of ACK/NACK signals for the data received from each DL CC and send the plurality of ACK/NACK signals to a BS through the PUCCH of UL CCs of the PCell. In 3GPP LTE, if it is necessary to send an ACK/NACK signal for a DL CC, the following three cases are present.

1) An ACK/NACK signal for the transmission of a PDSCH indicated by a corresponding PDCCH in a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for a common PDSCH is transmitted. The PDSCH may be present in both a PCell and an SCell.

2) An ACK/NACK signal for the PDCCH of a subframe (n−k) indicative of the release of DL Semi-Persistent Scheduling (SPS) may be transmitted in a subframe n. k∈K, and K is an M element aggregation $\{k_0, k_1, \ldots, k_{M-1}\}$ according to the subframe n and an UL/DL configuration. An ACK/NACK signal for a PDCCH indicative of the activation of DL SPS is not transmitted. A PDCCH indicative of the release of DL SPS may be present only in a PCell.

3) An ACK/NACK signal for the transmission of a PDSCH not including a PDCCH corresponding to a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for SPS is transmitted. Such a PDSCH may be present only in a PCell.

In the above description, K is called a bundling window. That is, the bundling window refers to one or more DL subframes corresponding to an ACK/NACK signal in a single UL subframe. In an FDD system, M=1, and K={$k_0$}={4}. Table 3 shows an example of an aggregation K in a TDD system.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, in LTE rel-10, an ACK/NACK response for a PDCCH indicative of the release of a PDSCH, DL SPS, and DP SPS is transmitted through the PUCCH formats 1/1a/1b or the PUCCH format 3. Periodic CSI feedback is transmitted through the PUCCH formats 2/2a/2b. Furthermore, if the simultaneous transmission of ACK/NACK (without a PUSCH) and periodic CSI is necessary, the behavior of UE is defined according to a PUCCH format. In this case, since different pieces of information are transmitted at the same time, specific information is dropped.

The present invention provides a method and apparatus for sending different pieces of information through a single physical channel structure. More particularly, the present invention provides a method and apparatus for giving a different implicit or explicit separate weight to each piece of information based on a separate coding method. In this case, to give a separate weight includes all methods of giving a weight to each piece of information. For example, to give a separate weight may means that a different and effective coding rate and/or power are configured to be used in each piece of information. In accordance with the present invention, different types of performance (e.g., a performance target and a required and received SNR) of respective pieces of information can be efficiently supported, and the dropping of specific information can be prevented.

For convenience of description, ACK/NACK information and periodic CSI are hereinafter described as examples of different pieces of information. However, the examples are only for convenience' sake, and the present invention is not limited to the type of information and a transmission format (e.g., a physical structure) or types/schemes, such as channel coding and MIMO, because the present invention is intended to efficiently support different types of performance (e.g., a performance target and a required and received SNR) of respective pieces of information and to prevent the dropping of specific information.

Furthermore, for convenience of description, the PUCCH format 3 in LTE rel-10 is chiefly described, and omitted parts of the description may be considered to be identical with the operations/structures/procedures of the existing PUCCH format 3. A modified form of the PUCCH format 3 (e.g., a form in which the number of RSs has been increased/decreased or the spreading factor of Orthogonal Cover Code (OCC) has been increased/decreased) is also included in the technical spirit of the present invention, and the technical spirit of the present invention may also be applied to a different type of transmission (e.g., the PUSCHs of the PUCCH formats 1 and 2) other than the PUCCH format 3.

Furthermore, hereinafter, Channel State Information (CSI) may be used as the same meaning as a CQI, but CSI may be used to include pieces of channel-related information, such as a Rank Indicator (RI) and a Pre-coding Matrix Indicator (PMI), in addition to the CQI.

Embodiment 1

In an embodiment of the present invention, in order to efficiently guarantee performance (e.g., a performance target and a required and received SNR) of more important information that belong to different pieces of information and prevent the dropping of specific information, UE may apply a weight based on information that requires higher priority or higher performance (e.g., information having a higher required SNR for each target), of a plurality of pieces of information. The embodiment may be implemented by selecting higher power from pieces of power for the plurality of pieces of information and using the selected power.

For example, if the simultaneous transmission of ACK/NACK and CSI is necessary, the priority of the ACK/NACK may be set to be higher than that of the CSI. In this case, if a plurality of pieces of information is multiplexed and transmitted, power control may be performed based on the ACK/NACK. From a viewpoint of the CSI, transmission is performed using excessive power, but the performance of more important ACK/NACK is guaranteed. The plurality of pieces of information may be subject to joint coding or may be subject to separate coding.

If a serving cell is a PCell, UE transmission power for PUCCH transmission in a subframe i may be defined by Equation 3.

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{T \times D}(F') + g(i) \end{Bmatrix} [dBm]$$

Equation 3

In such a case, parameters may be applied as follows for the PUCCH format 3.

If UE has been configured by an upper layer so that it sends a PUCCH through two antenna ports or the UE sends an HARQ-ACK/SR of 11 bits or more or sends HARQ-ACK, CSI, and an SR at the same time, $$h(n_{UCI}, n_{SR}) = \frac{n_{UCI} + n_{SR} - 1}{3} = \frac{n_{HARQ} + n_{CQI} + n_{SR} - 1}{3} \quad \text{Equation 4}$$

If not (e.g., a case in which CQI transmission is not necessary)

$$h(n_{UCI}, n_{SR}) = \frac{n_{HARQ} + n_{SR} - 1}{2} \quad \text{Equation 5}$$

In Equations 4 and 5, $n_{UCI} = n_{HARQ} + n_{CQI}$.

Alternatively, parameters may be applied as follows for the PUCCH format 3.

If UE has been configured by an upper layer so that it sends a PUCCH through two antenna ports or the UE sends HARQ-ACK/SR of 11 bits or more or sends HARQ-ACK, CSI, and an SR at the same time, $$h(n_{CQI}, n_{HARQ}, n_{SR}) = \frac{n_{CQI} + n_{HARQ} + n_{SR} - 1}{3} \quad \text{Equation 6}$$

If not (e.g., a case in which CQI transmission is not necessary)

$$h(n_{CQI}, n_{HARQ}, n_{SR}) = \frac{n_{HARQ} + n_{SR} - 1}{2} \quad \text{Equation 7}$$

For other parameters in the above equations, reference may be made to Paragraph 5.1.1.1 of a 3rd Generation Partnership Project (3GPP) TS 36.213 V10.3.0 (2011-09) "Technical Specification Group Radio Access Network; Evolved Universal Terrestrial Radio Access (E-UTRA); Physical layer procedures channels and modulation (Release 10)".

Embodiment 2

In another embodiment of the present invention, if different pieces of information are transmitted at the same time, in order to efficiently manage power of UE or prevent the dropping of specific information, a weight may be applied based on information that requires lower priority or low performance (e.g., information having a low required SNR for each target), of a plurality of pieces of information. The embodiment may be implemented by selecting lower power from pieces of power for the plurality of pieces of information and using the selected power.

For example, if the simultaneous transmission of ACK/NACK and CSI is necessary, the priority of ACK/NACK may be set to be higher than that of the CSI. In this case, if a plurality of pieces of information is multiplexed and transmitted, power control may be performed based on the CSI. From a viewpoint of the ACK/NACK, transmission is performed using insufficient power. The plurality of pieces of information may be subject to joint coding or may be subject to separate coding.

As described above, if a serving cell is a PCell, UE transmission power for PUCCH transmission in a subframe i may be defined by Equation 3.

In this case, parameters may be applied as follows for the PUCCH format 3.

If HARQ-ACK and a CQI are transmitted at the same time, $$h(n_{UCI}) = \begin{cases} 10\log_{10}\left(\frac{n_{UCI}}{4}\right) & \text{if } n_{UCI} \geq 4 \\ 0 & \text{otherwise} \end{cases} \quad \text{Equation 8}$$

In this case, $n_{UCI} = n_{HARQ} + n_{CQI}$.

If HARQ-ACK and a CQI are not transmitted at the same time,

If UE has been configured by an upper layer so that it sends a PUCCH through two antenna ports or the UE sends HARQ-ACK/SR of 11 bits or more, $$h(n_{CQI}, n_{HARQ}, n_{SR}) = \frac{n_{HARQ} + n_{SR} - 1}{3} \quad \text{Equation 9}$$

If not, $$h(n_{CQI}, n_{HARQ}, n_{SR}) = \frac{n_{HARQ} + n_{SR} - 1}{2} \quad \text{Equation 10}$$

Alternatively, parameters may be applied as follows for the PUCCH format 3.

if HARQ-ACK and a CQI are transmitted at the same time, $$h(n_{CQI}, n_{HARQ}, n_{SR}) = \quad \text{Equation 11}$$
$$\begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

If HARQ-ACK and a CQI are not transmitted at the same time,

If UE has been configured by an upper layer so that it sends a PUCCH through two antenna ports or the UE sends HARQ-ACK/SR of 11 bits or more, $$h(n_{CQI}, n_{HARQ}, n_{SR}) = \frac{n_{HARQ} + n_{SR} - 1}{3} \quad \text{Equation 12}$$

If not, $$h(n_{CQI}, n_{HARQ}, n_{SR}) = \frac{n_{HARQ} + n_{SR} - 1}{2} \quad \text{Equation 13}$$

Alternatively, parameters may be applied as follows for the PUCCH format 3.

If HARQ-ACK and a CQI are transmitted at the same time, $$h(n_{UCI}) = \begin{cases} 10\log_{10}\left(\frac{n_{UCI}}{4}\right) & \text{if } n_{UCI} \geq 4 \\ 0 & \text{otherwise} \end{cases} \quad \text{Equation 14}$$

In this case, $n_{UCI} = n_{HARQ} + n_{CQI} + n_{SR}$.

If HARQ-ACK and a CQI are not transmitted at the same time,

If UE has been configured by an upper layer so that it sends a PUCCH through two antenna ports or the UE sends HARQ-ACK/SR of 11 bits or more, $$h(n_{CQI}, n_{HARQ}, n_{SR}) = \frac{n_{HARQ} + n_{SR} - 1}{3} \quad \text{Equation 15}$$

If not, $$h(n_{CQI}, n_{HARQ}, n_{SR}) = \frac{n_{HARQ} + n_{SR} - 1}{2} \quad \text{Equation 16}$$

Alternatively, parameters may be applied as follows for the PUCCH format 3.

If HARQ-ACK and a CQI are transmitted at the same time, $$h(n_{CQI}, n_{HARQ}, n_{SR}) = \quad \text{Equation 17}$$
$$\begin{cases} 10\log_{10}\left(\frac{n_{CQI} + n_{HARQ} + n_{SR}}{4}\right) & \text{if } n_{CQI} + n_{HARQ} + n_{SR} \geq 4 \\ 0 & \text{otherwise} \end{cases}$$

If HARQ-ACK and a CQI are not transmitted at the same time,

If UE has been configured by an upper layer so that it sends a PUCCH through two antenna ports or the UE sends HARQ-ACK/SR of 11 bits or more, $$h(n_{CQI}, n_{HARQ}, n_{SR}) = \frac{n_{HARQ} + n_{SR} - 1}{3} \quad \text{Equation 17}$$

If not, $$h(n_{CQI}, n_{HARQ}, n_{SR}) = \frac{n_{HARQ} + n_{SR} - 1}{2} \quad \text{Equation 18}$$

For other parameters in the above equations, reference may be made to Paragraph 5.1.1.1 of a 3rd Generation Partnership Project (3GPP) TS 36.213 V10.3.0 (2011-09) "Technical Specification Group Radio Access Network; Evolved Universal Terrestrial Radio Access (E-UTRA); Physical layer procedures channels and modulation (Release 10)".

Embodiment 3

In yet another embodiment of the present invention, in order to efficiently support different types of performance (e.g., a performance target and a required and received SNR) of respective pieces of information and prevent the dropping of specific information, a different implicit weight may be applied to each piece of information based on different separate coding.

In this a case, to apply a separate weight means that different coding is performed on each piece of information and may further mean that a configuration is performed so that a separation-effective coding rate is used. For example, a configuration is performed so that a different coding rate is used by changing mother code or so that a different effective coding rate is used through different rate matching irrespective of mother code.

Furthermore, to give an implicit separate weight includes all methods of giving a weight to each piece of information. For example, to give a separate weight may mean to perform a configuration so that a different effective coding rate is used in each piece of information.

Embodiment 3-1

Figure 9:
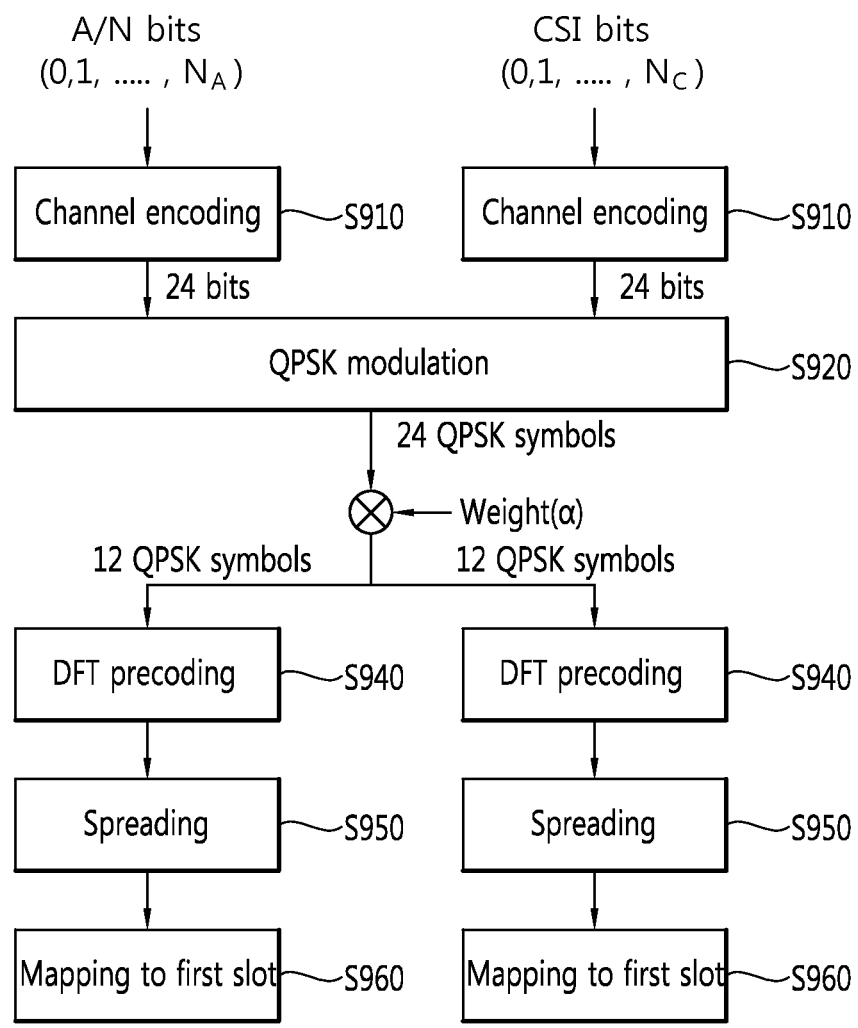
FIG. 9 shows an example in which separate coding and implicit separate weights are applied to two types of information.

FIG. 9 shows an example in which separate coding and implicit separate weights are applied to two types of information.

Referring to FIG. 9, two types of information include ACK/NACK bits 0, 1, ..., $N_A$ and CSI bits 0, 1, ..., $N_C$. Each separate coding (e.g., Reed-Muler (RM) or Turbo Block Convolution Code (TBCC)) may be applied to each of the piece of information (S910). For example, if the PUCCH format 3 is used, two RM encoders may be used. Each of the RM encoders generates fixed encoded bits. A total of 48 encoded bits are generated because each RM encoder always generates 24 encoded bits irrespective of the number of information bits.

The generated encoded bits are generated into 24 QPSK modulated symbols through QPSK modulation (S920).

The 24 QPSK modulated symbols are divided into two, subject to DFT precoding and spreading, and then mapped to respective slots within a subframe (S940 to S960).

In this case, power control of a single PUCCH format may be performed based on a weight. In the example of FIG. 9, the step S930 of applying a weight is placed between the modulation step S920 and the precoding step S940, but may be performed at a different location and the present invention is not limited thereto. For example, the step S930 of applying a weight may be performed between the spreading step S950 and the step S960 of mapping the 12 QPSK modulated symbols to each slot.

Embodiment 3-2

Meanwhile, in the case where higher performance is required in ACK/NACK than in CSI, if power control adapted to the CSI is applied, performance required for the ACK/NACK may be deteriorated. In contrast, if power control adapted to the ACK/NACK is applied, excessive power is used in the transmission of the CSI. Accordingly, as in an example of FIG. 10, a different coding rate or rate matching may be performed by taking a different type of performance required for each piece of information into consideration while mapping each piece of information to a dual encoder.

Figure 10:
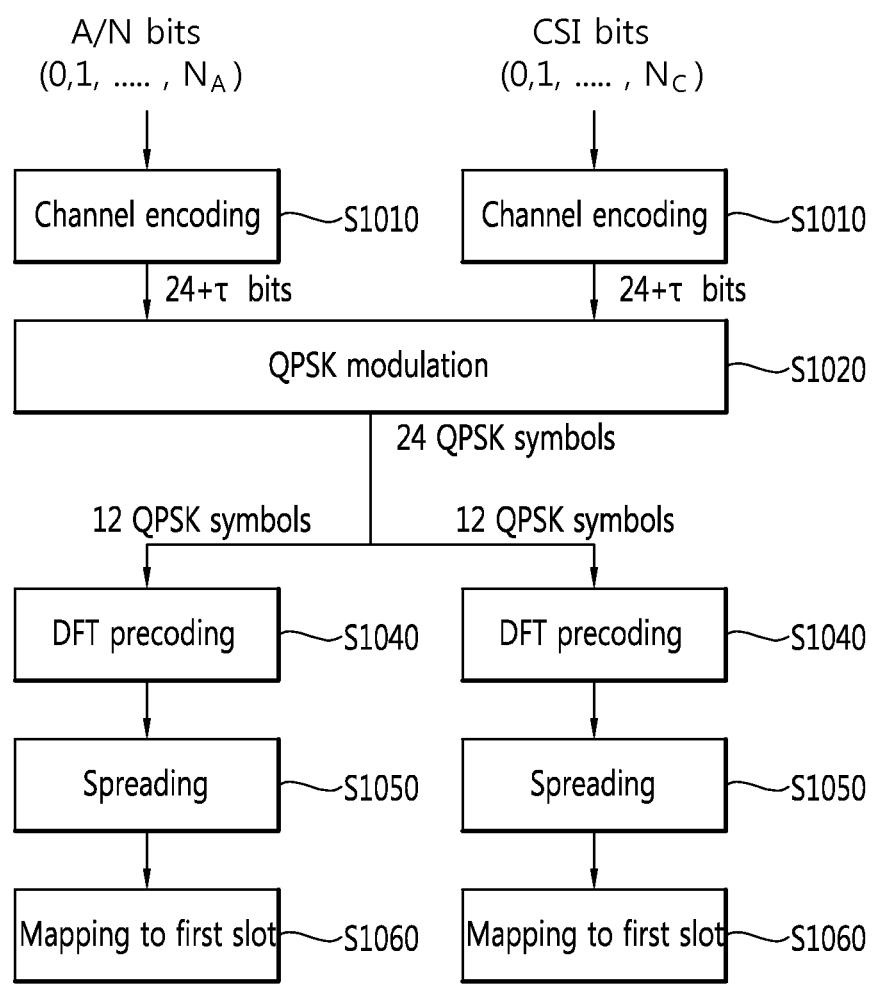
FIG. 10 shows another example in which separate coding is applied to two types of information.

FIG. 10 shows another example in which separate coding is applied to two types of information.

Referring to FIG. 10, a total number of 48 encoded bits is maintained identically as in an existing art in the dual encoder. However, the number of encoded bits generated by each encoder is different (S1010). More particularly, the number of encoded bits of ACK/NACK that is relatively more important is increased by τ, whereas the number of encoded bits of CSI that is relatively less important is reduced by τ. The setting of τ may comply with a predetermined rule or may be indicated by an RRC, MAC, or PHY layer. For example, the setting of τ may be previously defined as a function relating to a ratio of the number of information bits of ACK/NACK or may be previously defined as a function relating to a difference between the required (received) SNR of performance required for ACK/NACK and the required (received) SNR of performance required for the CSI. In the example of FIG. 10, existing steps may be identically applied to other steps S1020 and S1040 to S1060.

In Embodiment 3-2, although power control is performed irrespective of information included in the PUCCH format, that is, although an implicit weight is not applied as in Embodiment 3-1, there is an advantage in that an implicit (or virtual) weight or implicit (or virtual) power control has been applied to the information depending on a different coding rate (or rate matching).

Meanwhile, in Embodiment 3-1 and Embodiment 3-2, in order to reduce the influence of continuous errors and to obtain slot diversity by sending each piece of information to both the slots, interleaving may be performed. That is, a bit-level interleaver or a symbol-level interleaver may be used.

Furthermore, a parallel-to-serial converter or a serial-to-parallel converter may be used to change encoded bits generated by each encoder, that is, vectors (e.g., {a,b,c,d} and {e,f,g,h}), into a single vector {a,b,c,d,e,f,g,h} or to change a single vector into vectors.

Embodiment 4

In yet another embodiment of the present invention, in order to efficiently support different types of performance (e.g., a performance target and a required and received SNR) of respective pieces of information and prevent the dropping of specific information, a different explicit weight may be applied to each piece of information based on different separate coding.

In this case, to apply a separate weight may mean that different coding is performed on each piece of information. The effective coding rates of pieces of information may be the same or different.

Furthermore, to apply an explicit separate weight includes all methods of applying a weight to each piece of information. For example, to apply a separate weight may mean that a configuration is performed so that different power is used in each piece of information.

Embodiment 4-1

Figure 11:
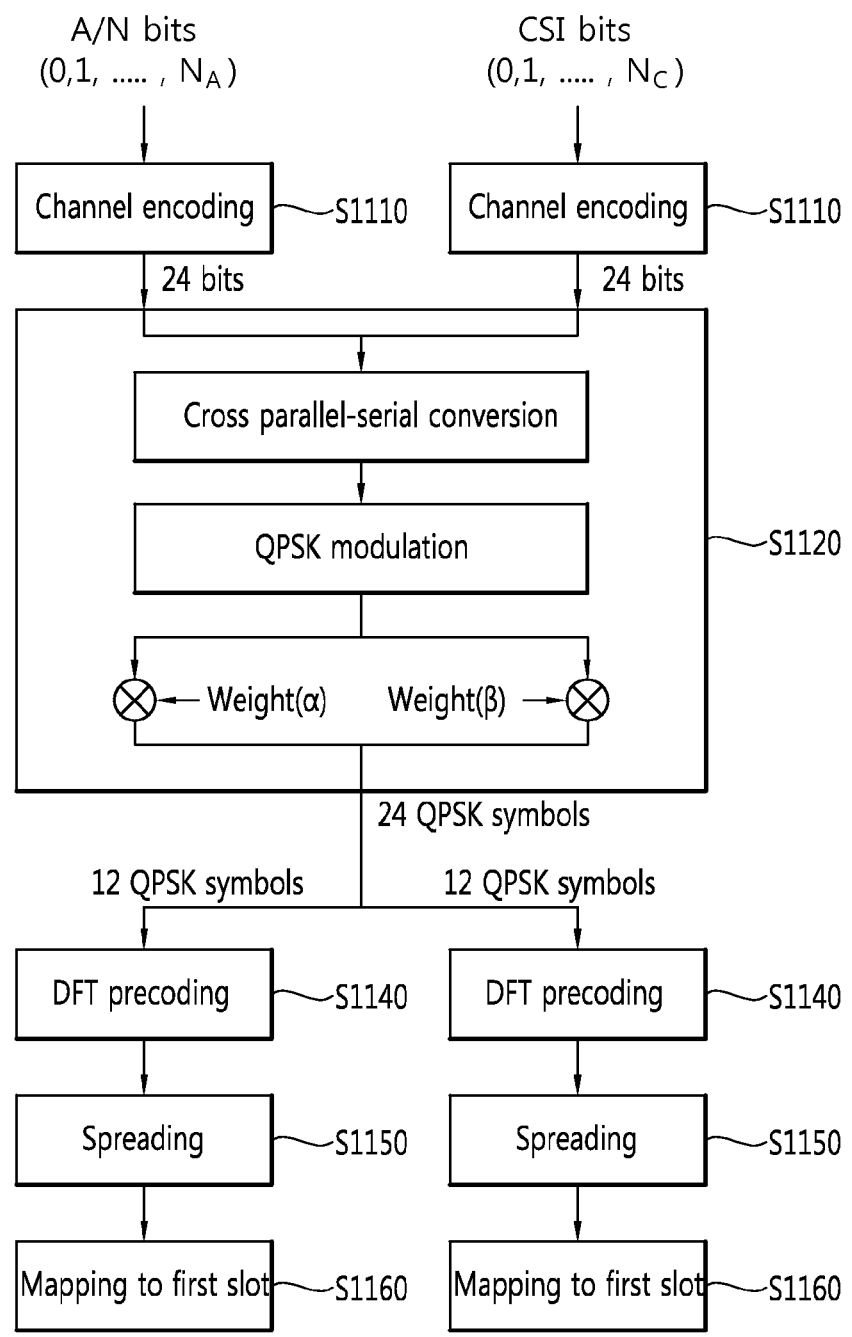
FIG. 11 shows an example in which separate coding and explicit separate weights are applied to two types of information.

FIG. 11 shows an example in which separate coding and explicit separate weights are applied to two types of information.

Referring to FIG. 11, two types of information include ACK/NACK bits $0, 1, \ldots, N_A$ and CSI bits $0, 1, \ldots, N_C$. Each separate coding (e.g., Reed-Muler (RM) or Turbo Block Convolutional Code (TBCC)) may be applied to each of the pieces of information (S1110). For example, if the PUCCH format 3 is used, two RM encoders may be used. Each of the RM encoders generates fixed encoded bits. A total of 48 encoded bits are generated because each RM encoder always generates 24 encoded bits irrespective of the number of information bits.

The generated encoded bits are generated into 24 QPSK modulation symbols through QPSK modulation (S1120). In this case, QPSK modulation is not simply used, but QPSK modulation modified so that the pieces of information are divided and mapped to the I-axis and Q-axis (i.e., a real part and an imaginary part) of a QPSK constellation, and a different weight is applied to each of the axes. More particularly, precoding is performed using a cross parallel-serial converter so that the pieces of information are divided and mapped in the I-axis and Q-axis of the QPSK constellation, and QPSK modulation is then performed. In this case, the cross parallel-serial converter means a parallel-serial converter as elements that output {a,e,b,f,c,g,d,h} when input is {a,b,c,d} and {e,f,g,h}.

Meanwhile, if modulation (e.g., '00', '01', '10', or '11') is performed in a bit level, the same results as that in which one piece of information is mapped to a Most Significant Bit (MSB) and the other piece of information is mapped to a Least Significant Bit (LSB) can be obtained. For example, a precoding process may be performed such that a bit stream from a first encoder is mapped to the MSB on a QPSK constellation (2-bit) and a bit stream from a second encoder is mapped to the LSB on the QPSK constellation (2-bit). In this case, there is an advantage in that pieces of information are divided and mapped to the real part and imaginary part of the QPSK constellation, respectively. That is, the pieces of information may be mapped to the real part and the imaginary part of a constellation of $k*(1+j)$, $k*(1-j)$, $k*(-1+j)$ or $k*(-1-j)$ through QPSK modulation. Hereinafter, k=1 is assumed and described, for convenience of description, but k may have a different value (e.g., k=2/root(2)).

Different weights may be applied to the pieces of information that have been modulated into $\{(a+j*e), (b+j*f), (c+j*g), (d+j*h)\}$ and divided and mapped to the I-axis and the Q-axis on the QPSK constellation through the aforementioned process. As in the example of FIG. 11, a weight α and a weight β may be applied to respective pieces of information. In the case of modulation into $\{(a+j*e),(b+j*f),(c+j*g),(d+j*h)\}$, QPSK symbols in which different weights have been applied to the I-axis and the Q-axis, such as $\{(\alpha*a+\beta*(j*e)),(\alpha*b+\beta*(j*f), (\alpha*c+\beta*(j*g)),(\alpha*d+\beta*(j*h))\}$, may be generated.

Thereafter, the 24 QPSK modulation symbols are divided into two, subject to DFT precoding and spreading, and then mapped to respective slots within a subframe (S1140 to S1160).

Embodiment 4-2

Figure 12:
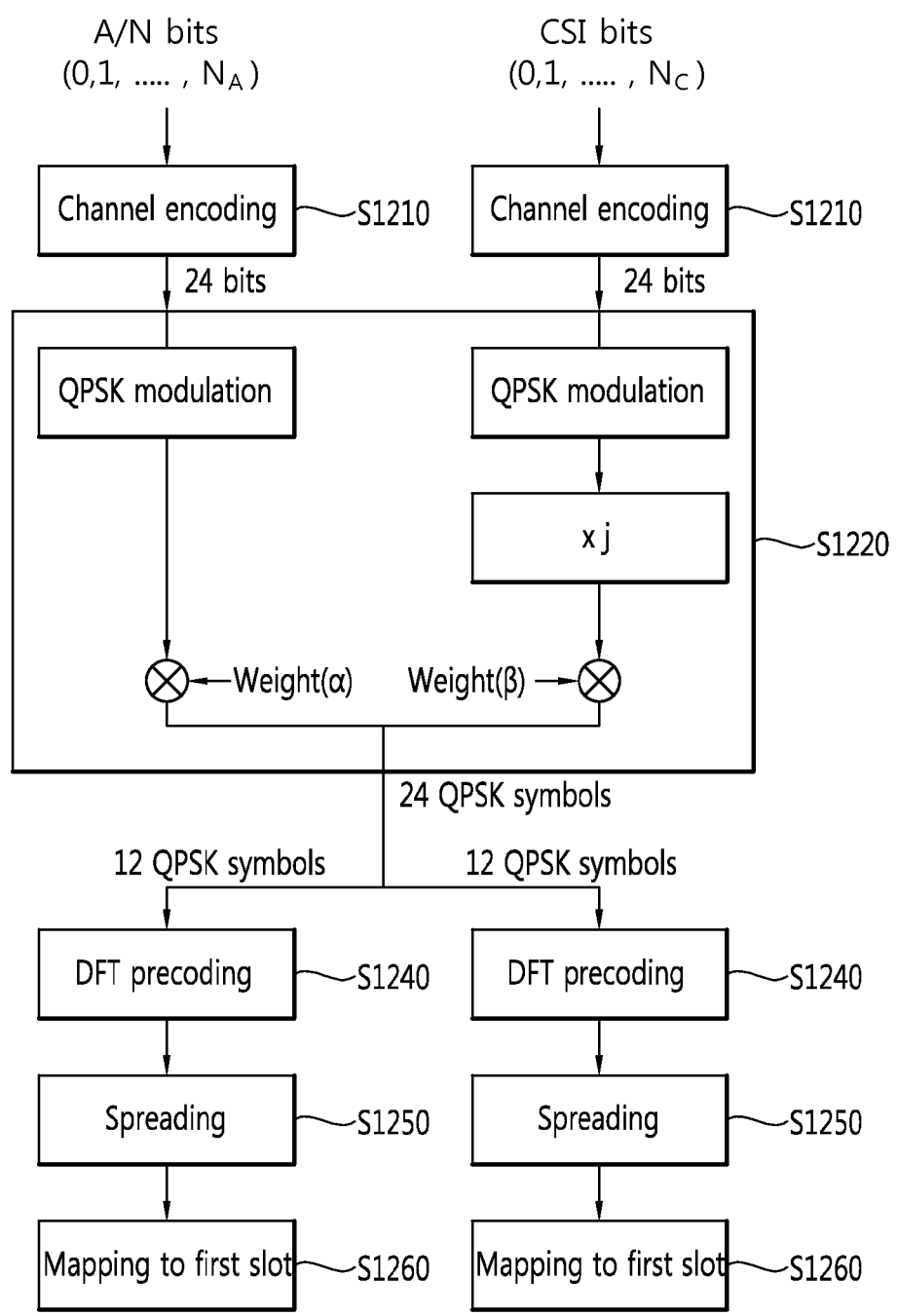
FIG. 12 shows another example in which separate coding and explicit separate weights are applied to two types of information.

FIG. 12 shows another example in which separate coding and explicit separate weights are applied to two types of information.

Referring to FIG. 12, two types of information include ACK/NACK bits $0, 1, \ldots, N_A$ and CSI bits $0, 1, \ldots, N_C$. Each separate coding (e.g., Reed-Muler (RM) or Turbo Block Convolution Code (TBCC)) may be applied to each of the piece of information (S1210). For example, if the PUCCH format 3 is used, two RM encoders may be used. Each of the RM encoders generates fixed encoded bits. A total of 48 encoded bits are generated because each RM encoder always generates 24 encoded bits irrespective of the number of information bits.

The generated encoded bits are generated into 24 QPSK modulation symbols through QPSK modulation (S1220). In this case, QPSK modulation is not simply used, but modulation modified so that each piece of information (or an encoded bit stream) becomes a BPSK constellation is used. The BPSK constellation means modulation of +k or −k. Hereinafter, k=1 is assumed and described, for convenience of description.

Thereafter, one piece of information (or the encoded bit stream) is used as a real number without change, and the other piece of information (or the encoded bit stream) is generated into an imaginary number by multiplying the other piece of information by an imaginary number j. For example, assuming that one piece of information is {a,b,c,d} and the other piece of information is {e,f,g,h}, {a,b,c,d} and {j*e,j*f,j*g, j*h} may be obtained by multiplying {e,f,g,h} by the imaginary number j. If the two types of information strings are added one by one, a QPSK symbol may be obtained. That is, $\{(a+j*e),(b+j*f),(c+j*g),(d+j*h)\}$ may be obtained by adding {a,b,c,d} and {j*e,j*f,j*g,j*h} together. Accordingly, the same results as those of Embodiment 4-1 in which QPSK modulation modified so that different pieces of information are divided and mapped to a real part and an imaginary part on a QPSK constellation is used.

Meanwhile, if modulation (e.g., '00', '01', '10', or '11') is performed in a bit level, the same results as that in which one piece of information is mapped to a Most Significant Bit (MSB) and the other piece of information is mapped to a Least Significant Bit (LSB) can be obtained. For example, a precoding process may be performed such that a bit stream from a first encoder is mapped to the MSB on a QPSK constellation (2-bit) and a bit stream from a second encoder is mapped to the LSB on the QPSK constellation (2-bit). In this case, there is an advantage in that pieces of information are divided and mapped to the real part and imaginary part of the QPSK constellation, respectively Furthermore, like in Embodiment 4-1, a different weight may be applied to each axis. That is, different weights may be applied to the pieces of information that have been modulated into $\{(a+j*e),(b+j*f),(c+j*g),(d+j*h)\}$ and divided and mapped to the I-axis and the Q-axis of the QPSK constellation through the aforementioned process. As in the example of FIG. 12, a weight $\alpha$ and a weight $\beta$ may be applied to the pieces of information, respectively. In the case of modulation into $\{(a+j*e),(b+j*f),(c+j*g),(d+j*h)\}$, QPSK symbols in which different weights have been applied to the I-axis and the Q-axis, such as $\{(\alpha*a+\beta*(j*e)),(\alpha*b+\beta*(j*f)),(\alpha*c+\beta*(j*g)),(\alpha*d+\beta*(j*h))\}$, may be generated.

Thereafter, the 24 QPSK modulation symbols are divided into two, subject to DFT precoding and spreading, and then mapped to respective slots within a subframe (S1240 to S1260).

Meanwhile, in Embodiment 4-1 and Embodiment 4-2, the location of the step of applying the weights may be changed, and the present invention is not limited thereto. For example, as in the examples of FIGS. 11 and 12, the weights may be applied in the QPSK modulation steps S1120 and S1220, and the weights may be applied after the DFT precoding steps S1140 and S1240.

Furthermore, the setting of weights (e.g., $\alpha$ and $\beta$ in FIGS. 11 and 12) may comply with a predetermined rule or may be indicated by the RRC, MAC, or PHY layer. For example, the setting of respective weights may be previously defined as functions relating to the power control of ACK/NACK and CSI.

Furthermore, in Embodiment 4-1 and Embodiment 4-2, order of the channel encoders to which the ACK/NACK bits and the CSI bits are mapped is not limited. Accordingly, in mapping the two pieces of information to the real part and the imaginary part on the QPSK constellation, what information will be mapped to a real number and what information will be mapped to an imaginary number may comply with a predetermined rule. That is, as in the examples of FIGS. 11 and 12, the ACK/NACK bits may be mapped to the real part and the CSI bit may be mapped to the imaginary part, but the ACK/NACK bits may be mapped to the imaginary part and the CSI bits may be mapped to the real part.

Furthermore, in order to reduce the influence of continuous errors, interleaving may be performed. That is, a bit-level interleaver or a symbol-level interleaver may be used.

Meanwhile, the aforementioned embodiments may be complexly implemented/applied.

For example, Embodiment 4 may be applied while implementing Embodiment 1. If power control is performed based on ACK/NACK as in Embodiment 1, unnecessary power is used for CSI having relatively lower priority than the ACK/NACK. This may be solved by applying the method of Embodiment 4.

Assuming that a and b are values mapped to a real part and an imaginary part, respectively, on a QPSK constellation and $\alpha$ and $\beta$ are the respective weights of the real part and the imaginary part, all signals are represented by $(\alpha*a+j*\beta*b)$. If power control is performed on all the signals on the basis of ACK/NACK, power of the ACK/NACK, that is, the real part, needs not to be changed because it has already been fixed. That is, $\alpha=1$. The CSI, that is, the imaginary part, uses excessive power, and thus power of the CSI may be reduced by applying a value smaller than 1 to $\beta$. For example, assuming that a ratio of the required (received) SNR of the CSI to the ACK/NACK is k, $\beta$ may be defined as 1/k or a function relating to k.)

For another example, Embodiment 4 may be applied while implementing Embodiment 2. If power control is performed based on CSI as in Embodiment 2, insufficient power is used in ACK/NACK having relatively higher priority than the CSI. This may be solved by applying the method of Embodiment 4.

Assuming that a and b are values mapped to a real part and an imaginary part, respectively, on a QPSK constellation and $\alpha$ and $\beta$ are the respective weights of the real part and the imaginary part, all signals are represented by $(\alpha*a+j*\beta*b)$. If power control is performed on all the signals on the basis of CSI, power of the CSI, that is, the imaginary part, needs not to be changed because it has already been fixed. That is, $\beta=1$. The ACK/NACK, that is, the real part, uses insufficient power, and thus power of the ACK/NACK may be increased by applying a value greater than 1 to $\alpha$. (For example, assuming that a ratio of the required (received) SNR of the CSI to the ACK/NACK is k, $\alpha$ may be defined as k or a function relating to k.)

For another example, Embodiment 3-2 may be applied while implementing Embodiment 1. If power control is performed based on ACK/NACK as in Embodiment 1, unnecessary power is used in CSI having relatively lower priority than the ACK/NACK. This may be solved by applying the method of Embodiment 3-2.

$\tau$ in Embodiment 3-2 may be changed. That is, if power control is performed on all signals based on ACK/NACK, the same effect that the use of excessive power in the CSI part has been reduced can be obtained by applying a value greater than 1 to $\tau$. (For example, assuming that a ratio of the required (received) SNR of the CSI to the ACK/NACK is k, $\tau$ may be defined as 1/k or a function relating to k.)

For another example, Embodiment 3-2 may be applied while implementing Embodiment 2. If power control is performed based on CSI as in Embodiment 2, insufficient power is used in ACK/NACK having relatively higher priority than the CSI. This may be solved by applying the method of Embodiment 3-2.

$\tau$ in Embodiment 3-2 may be changed. That is, if power control is performed on all signals based on CSI, the same effect that the use of insufficient power in the ACK/NACK part has been increased can be obtained by applying a value greater than 1 to $\tau$. (For example, assuming that a ratio of the required (received) SNR of the CSI to the ACK/NACK is k, $\tau$ may be defined as 1/k or a function relating to k.)

Figure 13:
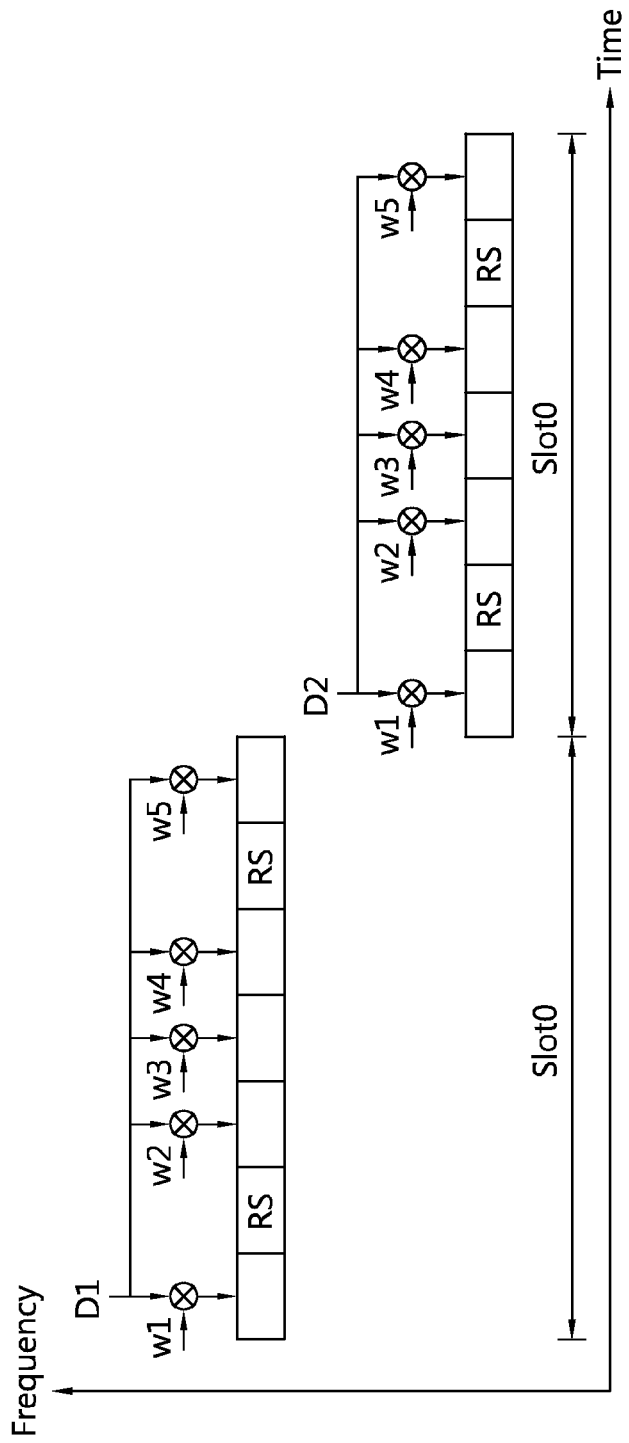
FIGS. 13 and 14 show examples in which modulation symbols are mapped to respective slots.
Figure 14:
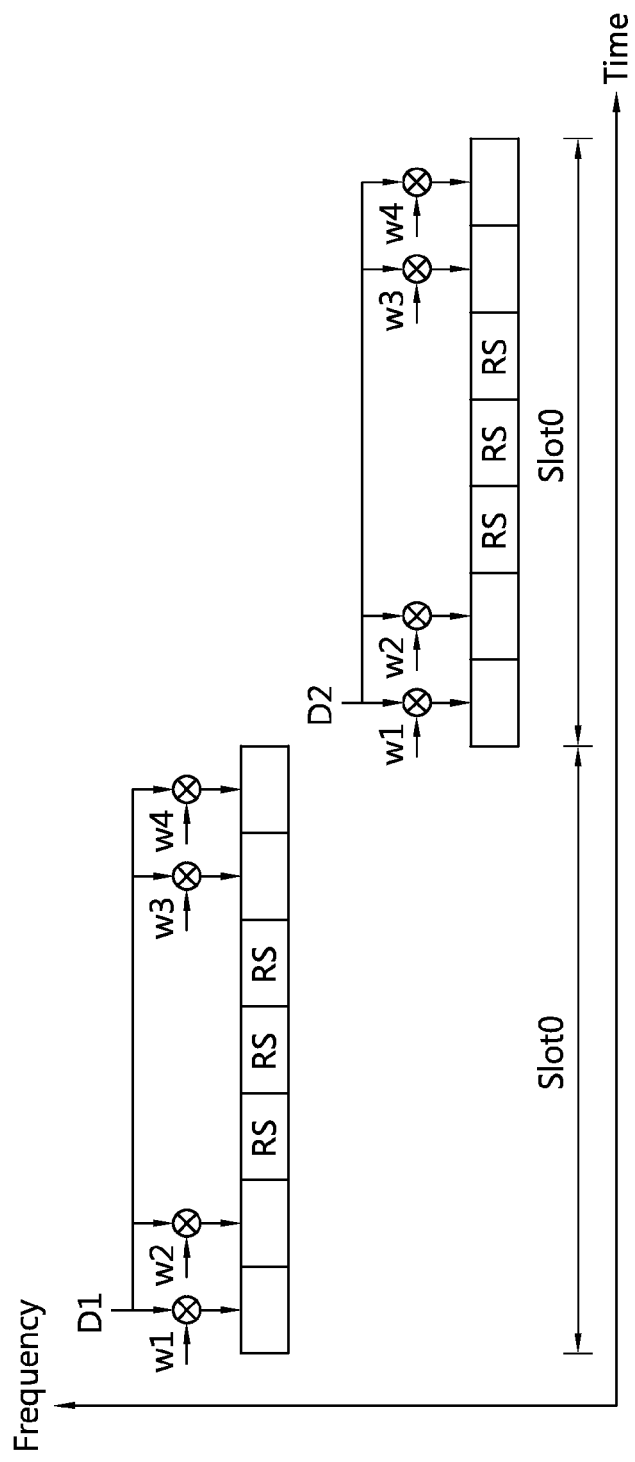

FIGS. 13 and 14 show examples in which modulation symbols are mapped to respective slots.

In the aforementioned embodiments (FIGS. 9 to 12), assuming that symbol vectors mapped to the slot 1 and the slot 2 are defined as D1 and D2, respectively, examples in which D1 and D2 are mapped to a PUCCH format structure are shown in FIGS. 13 and 14. FIG. 13 shows an example in which modulation symbols are applied to each slot of the PUCCH format 3 when a Spreading Factor (SF) is 5, and FIG.

14 shows an example in which the modulation symbols are mapped to each slot of the PUCCH format 3 when a Spreading Factor (SF) is 4.

An example in which the two pieces of information are transmitted through the PUCCH format 3 has been described, for convenience of description, but the present invention is not limited thereto. For example, the two pieces of information may be applied to a new format which uses an SF smaller than that of the PUCCH format 3.

Figure 15:
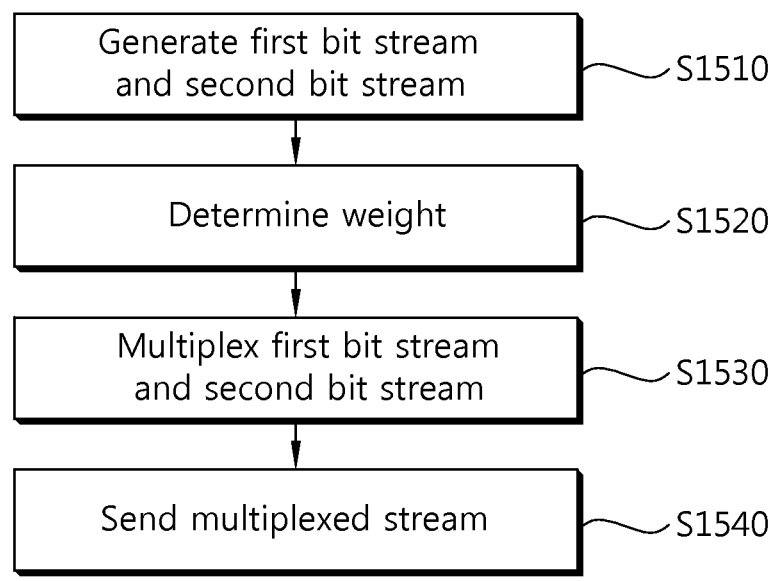
FIG. 15 shows an example of a method of transmitting control information through uplink in a wireless communication system according to the present invention.

FIG. 15 shows an example of a method of transmitting control information through uplink in a wireless communication system according to the present invention.

UE generates a first bit stream and a second bit stream (S1510). In this case, the first bit stream is a bit stream related to first control information, and the second bit stream is a bit stream related to second control information. As described above, the first control information may be HARQ ACK/NACK, and the second control information may be CSI.

The UE determines the weight of the first control information in relation to the second control information (S1520). As described above, the weight may mean separate coding, an implicit weight, an explicit weight, power control, etc. That is, the UE may determine transmission power of the first bit stream and the second bit stream and/or the effective coding rates of the first bit stream and the second bit stream based on the weight. The weight may be determined based on the priority (i.e., importance) of the first control information and the second control information and/or required performance (e.g., a performance target and a required and received SNR). Furthermore, the weight may be determined by the UE, but the weight may comply with a predetermined rule or may be indicated by the RRC, MAC, or PHY layer. That is, the weight determination step S1520 does not mean that the UE simply determines the weight, but means that the UE obtains a weight in various ways and determines transmission power and/or determines an effective coding rate based on the weight.

The UE generates a multiplexed bit stream by multiplexing the first bit stream and the second bit stream (S1530). The step S1530 of multiplexing the first bit stream and the second bit stream may include the DFT precoding step S940, S1040, S1140, or S1240, the spreading step S950, S1050, S1150, or S1250, the mapping step S960, S1060, S1160, or S1260, etc.

The UE sends the multiplexed bit stream to a BS (S1540). In this case, the multiplexed bit stream, that is, the first control information and the second information, may be transmitted through the PUCCH format 3. Furthermore, as described above, the UE may send the first control information and the second control information based on the weight determined at step S1520. For example, the transmission power may be determined based on any piece of control information as in Embodiment 1 or Embodiment 2 and may be determined using separate coding and/or a weight as in Embodiment 3 or Embodiment 4. Furthermore, the transmission power may be complexly implemented and applied through a combination of the aforementioned methods.

Accordingly, according to the aforementioned methods, since the weight of each piece of information can be differently applied, power control suitable and efficient for each piece of information can be performed. Different types of performance (e.g., a performance target or a required and received SNR) of pieces of information can be efficiently supported. For example, as in the examples of FIGS. 11 and 12, different weights may be applied without an influence in demodulation by mapping different pieces of information to two encoders and mapping the different pieces of information to different axes (i.e., a real part and an imaginary part) on a modulation constellation by taking different types of performance of the pieces of information into consideration.

Figure 16:
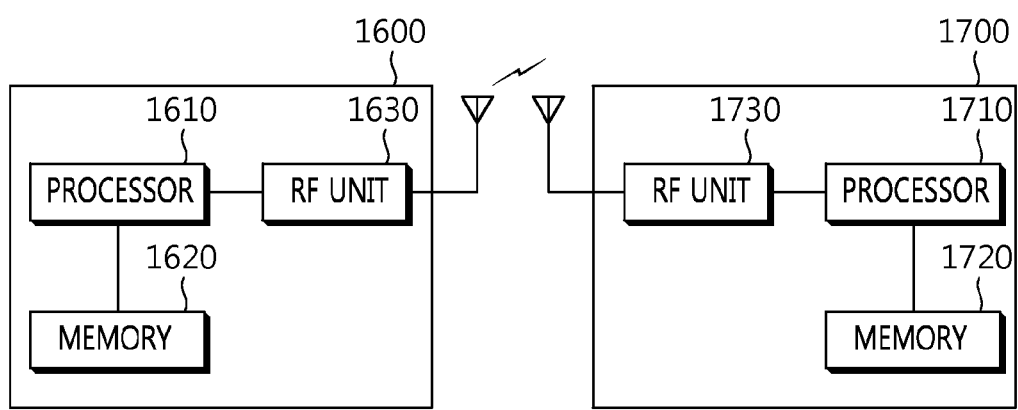
FIG. 16 is a block diagram of a wireless communication system in which an embodiment of the present invention is implemented.

FIG. 16 is a block diagram of a wireless communication system in which an embodiment of the present invention is implemented.

A BS 1600 includes a processor 1610, memory 1620, and a Radio Frequency (RF) unit 1630. The processor 1610 implements the proposed functions, processes and/or methods. The layers of a radio interface protocol may be implemented by the processor 1610. The memory 1620 is connected to the processor 1610, and it stores various pieces of information for driving the processor 1610. The RF unit 1630 is connected to the processor 1610, and it sends and/or receives radio signals.

UE 1700 includes a processor 1710, memory 1720, and an RF unit 1730. The processor 1710 implements the proposed functions, processes and/or methods. The layers of a radio interface protocol may be implemented by the processor 1710. The memory 1720 is connected to the processor 1710, and it stores various pieces of information for driving the processor 1710. The RF unit 1730 is connected to the processor 1710, and it sends and/or receives radio signals.

The processor 1610, 1710 may include Application-Specific Integrated Circuits (ASICs), other chipsets, logic circuits, and/or data processing devices. The memory 1620, 1720 may include Read-Only Memory (ROM), Random Access Memory (RAM), flash memory, memory cards, storage media and/or other storage devices. The RF unit 1630, 1730 may include baseband circuits for processing radio signals. When an embodiment is implemented in software, the above-described scheme may be implemented as a module (process, function, etc.) for performing the above-described functions. The module may be stored in the memory 1620, 1720 and executed by the processor 1610, 1710. The memory 1620, 1720 may be placed inside or outside the processor 1610, 1710 and connected to the processor 1610, 1710 using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The above embodiments include various aspects of examples. Although all possible combinations for representing the various aspects may not be described, those skilled in the art will appreciate that other combinations are possible. Accordingly, the present invention should be construed as including all other replacements, modifications, and changes which fall within the scope of the claims.

What is claimed is:

1. A method for transmitting control information through uplink in a wireless communication system, by a user equipment, the method comprising the steps of:
generating a first bit stream related to first control information and a second bit stream related to second control information;
determining transmission power of each of the first bit stream and the second bit stream based on a weight of the first control information in relation to the second control information;
determining effective coding rates of the first bit stream and the second bit stream based on the weight, wherein the first bit stream and the second bit stream are subject to channel coding based on the effective coding rates;

generating a multiplexed bit stream by multiplexing the first bit stream and the second bit stream; and transmitting the multiplexed bit stream to a base station based on the transmission power.

2. The method of claim 1, wherein:
the first information is HARQ ACK or NACK, and
the second information is Channel State Information (CSI).

3. The method of claim 2, wherein the first bit stream and the second bit stream are transmitted through a Physical Uplink Control Channel (PUCCH) format 3.

4. The method of claim 3 wherein the step of determining the transmission power comprises steps of:

modulating the first bit stream and the second bit stream using QPSK;

mapping the modulated first bit stream to a real part of a QPSK constellation and mapping the modulated second bit stream to an imaginary part of the QPSK constellation; and applying the weight to the imaginary part of the QPSK constellation.

5. The method of claim 3, wherein the step of determining the transmission power comprises steps of:

modulating the first bit stream and the second bit stream using QPSK;

mapping the modulated first bit stream to a real part of a QPSK constellation;

multiplying the modulated second bit stream by an imaginary number j and mapping the multiplied second bit stream to an imaginary part of the QPSK constellation; and applying the weight to the imaginary part of the QPSK constellation.

6. The method of claim 1, further comprising a step of performing interleaving on the first bit stream and the second bit stream.

7. The method of claim 1, wherein the weight is determined based on priorities of the first control information and the second control information.

8. A method for transmitting control information through uplink in a wireless communication system, by user equipment, the method comprising steps of:

generating a first bit stream for first control information and a second bit stream for a second control information;

determining effective coding rates of the first bit stream and the second bit stream based on a weight of the first control information in relation to the second control information;

performing channel coding on the first bit stream and the second bit stream based on the effective coding rates;

generating a multiplexed bit stream by multiplexing the channel-coded first bit stream and the channel-coded second bit stream; and transmitting the multiplexed bit stream to a base station.

9. The method of claim 8, wherein:
the first information is HARQ ACK or NACK, and
the second information is Channel State Information (CSI).

10. The method of claim 9, wherein the first bit stream and the second bit stream are transmitted through a Physical Uplink Control Channel (PUCCH) format 3.

11. The method of claim 8, the weight is determined based on priorities of the first control information and the second control information.

12. A wireless device for transmitting control information through uplink in a wireless communication system, the wireless device comprises:

a radio frequency (RF) unit for transmitting and receiving a radio signal; and a processor operatively coupled to the RF unit, wherein the processor is configured for:

generating a first bit stream related to first control information and a second bit stream related to second control information;

determining transmission power of each of the first bit stream and the second bit stream based on a weight of the first control information in relation to the second control information;

determining effective coding rates of the first bit stream and the second bit stream based on the weight, wherein the first bit stream and the second bit stream are subject to channel coding based on the effective coding rates;

generating a multiplexed bit stream by multiplexing the first bit stream and the second bit stream; and transmitting the multiplexed bit stream to a base station based on the transmission power.

13. The wireless device of claim 12, wherein weight is determined based on priorities of the first control information and the second control information.

* * * * *